United States Patent
Li et al.

(10) Patent No.: US 10,887,248 B2
(45) Date of Patent: Jan. 5, 2021

(54) IO BANDWIDTH CONTROL METHOD, IO ACCESS REQUEST PROCESSING METHOD, APPARATUS, AND SYSTEM

(71) Applicant: Huawei Technologies Co., Ltd., Shenzhen (CN)

(72) Inventors: Yi Li, Shenzhen (CN); Jing Li, Shenzhen (CN); Yong Zhong, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 198 days.

(21) Appl. No.: 15/799,196

(22) Filed: Oct. 31, 2017

(65) Prior Publication Data
US 2018/0063022 A1    Mar. 1, 2018

Related U.S. Application Data

(63) Continuation of application No. PCT/CN2016/089836, filed on Jul. 12, 2016.

(51) Int. Cl.
*G06F 15/173* (2006.01)
*H04L 12/911* (2013.01)
(Continued)

(52) U.S. Cl.
CPC .......... *H04L 47/783* (2013.01); *G06F 9/5011* (2013.01); *G06F 16/182* (2019.01);
(Continued)

(58) Field of Classification Search
CPC ....... H04L 47/783; H04L 41/12; H04L 43/16; H04L 67/06; H04L 43/0876; H04L 67/32; G06F 16/182; G06F 9/5011
See application file for complete search history.

(56) References Cited

U.S. PATENT DOCUMENTS 5,784,569 A * 7/1998 Miller ............... G06F 13/3625
  348/E7.073
2003/0169688 A1* 9/2003 Mott ....................... H04L 47/11
  370/230
(Continued)

FOREIGN PATENT DOCUMENTS

CN   102646121 A   8/2012
CN   102857558 A   1/2013
(Continued)

OTHER PUBLICATIONS

Machine Translation and Abstract of Chinese Publication No. CN102646121, Aug. 22, 2012, 16 pages.
(Continued)

*Primary Examiner* — John B Walsh
(74) *Attorney, Agent, or Firm* — Conley Rose, P.C.

(57) ABSTRACT

An input output (IO) bandwidth control method, an IO access request processing method, an apparatus, and a system relate to the field of storage technologies, where the IO bandwidth control method, executed by a name node, includes determining an IO bandwidth of each data node in at least one data node and an IO bandwidth of a first tenant, and instructing the at least one data node to allocate the at least one IO bandwidth to the first tenant based on the IO bandwidth of each data node and the IO bandwidth of the first tenant, where the at least one IO bandwidth is in a one-to-one correspondence with the at least one data node, and each IO bandwidth in the at least one IO bandwidth is greater than 0 and is less than or equal to an IO bandwidth of a corresponding data node.

10 Claims, 10 Drawing Sheets

(51) Int. Cl.
*G06F 16/182* (2019.01)
*G06F 9/50* (2006.01)
*H04L 12/26* (2006.01)
*H04L 12/24* (2006.01)
*H04L 29/08* (2006.01)

(52) U.S. Cl.
CPC .......... *H04L 41/12* (2013.01); *H04L 43/0876* (2013.01); *H04L 43/16* (2013.01); *H04L 67/06* (2013.01); *H04L 67/32* (2013.01)

(56) References Cited

U.S. PATENT DOCUMENTS

| | | | |
|---|---|---|---|
| 2009/0288084 A1* | 11/2009 | Astete | G06F 9/45558 718/1 |
| 2013/0074091 A1 | 3/2013 | Xavier et al. | |
| 2014/0108639 A1 | 4/2014 | Nelke et al. | |
| 2014/0108648 A1 | 4/2014 | Nelke et al. | |
| 2014/0280970 A1 | 9/2014 | Pijewski et al. | |
| 2014/0297864 A1* | 10/2014 | Zhang | H04L 67/101 709/226 |
| 2015/0169376 A1* | 6/2015 | Chang | G06F 9/48 718/104 |
| 2015/0365325 A1* | 12/2015 | Hwang | H04L 47/70 370/230 |
| 2016/0124818 A1* | 5/2016 | Wang | G06F 9/45558 714/4.12 |

FOREIGN PATENT DOCUMENTS

| | | |
|---|---|---|
| CN | 103729250 A | 4/2014 |
| CN | 1037782556 A | 5/2014 |
| CN | 105208121 A | 12/2015 |
| EP | 2849386 A1 | 3/2015 |
| EP | 3024184 A1 | 5/2016 |

OTHER PUBLICATIONS

Machine Translation and Abstract of Chinese Publication No. CN102857558, Jan. 2, 2013, 20 pages.
Foreign Communication From a Counterpart Application, PCT Application No. PCT/CN2016/089836, International Search Report dated May 2, 2017, 4 pages.
Foreign Communication From a Counterpart Application, European Application No. 16890902.6, Extended European Search Report dated Sep. 25, 2018, 16 pages.
Machine Translation and Abstract of Chinese Publication No. CN105208121, Dec. 30, 2015, 7 pages.
Foreign Communication From a Counterpart Application, European Application No. 16890902.6, Partial Supplementary European Search Report dated Jun. 5, 2018, 13 pages.

* cited by examiner

IO BANDWIDTH CONTROL METHOD, IO ACCESS REQUEST PROCESSING METHOD, APPARATUS, AND SYSTEM

CROSS-REFERENCE TO RELATED APPLICATION

This application is a continuation of International Patent Application No. PCT/CN2016/089836 filed on Jul. 12, 2016, which is hereby incorporated by reference in its entirety.

TECHNICAL FIELD

The present application relates to the field of storage technologies, and in particular, to an input output (IO) bandwidth control method, an IO access request processing method, an apparatus, and a system.

BACKGROUND

With continuous development of storage technologies, a distributed file system is increasingly widely used. As shown in FIG. 1, FIG. 1 is a schematic diagram in which an application accesses a distributed file system.

Generally, when an application such as an application 1 accesses the distributed file system, the distributed file system may allocate an IO bandwidth 1 to the application 1 according to an IO access request 1 of the application 1. When another application such as an application 2 accesses the distributed file system, the distributed file system may reallocate a new IO bandwidth 2 to the application 2 according to an IO access request 2 of the application 2. The IO bandwidth 2 is different from the IO bandwidth 1.

In the foregoing technical solution, because the distributed file system needs to allocate different IO bandwidths to different applications, a manner of allocating an IO bandwidth is not flexible.

SUMMARY

This application provides an IO bandwidth control method, an IO access request processing method, an apparatus, and a system such that a manner of allocating an IO bandwidth is relatively flexible.

To achieve the foregoing objective, this application uses the following technical solutions.

According to a first aspect, an IO bandwidth control method applied to a distributed file system is provided. The distributed file system includes a name node and a at least one data node.

The method includes determining, by the name node, an IO bandwidth of each data node in the at least one data node and an IO bandwidth of a first tenant, and instructing, based on the IO bandwidth of each data node in the at least one data node and the IO bandwidth of the first tenant, the at least one data node to allocate at least one IO bandwidth to the first tenant.

The at least one IO bandwidth is in a one-to-one correspondence with the at least one data node, and each IO bandwidth in the at least one IO bandwidth is greater than 0 and is less than or equal to an IO bandwidth of a corresponding data node.

According to the foregoing method, an IO bandwidth can be allocated to a tenant in this application such that a manner of allocating an IO bandwidth is relatively flexible.

The IO bandwidth of the tenant is shared by at least one user, and each user in the at least one user corresponds to at least one application. Therefore, multiple applications corresponding to the at least one user that belongs to the tenant may share the IO bandwidth allocated to the tenant. Even if the multiple applications may be different at different moments, the multiple applications still share the IO bandwidth allocated to the tenant such that utilization of an IO bandwidth in the distributed file system can be improved.

In a first optional implementation manner of the first aspect, a sum of the at least one IO bandwidth is less than or equal to the IO bandwidth of the first tenant, or a sum of the at least one IO bandwidth is less than or equal to a sum of the IO bandwidth of the first tenant and an extra bandwidth.

According to the first optional implementation manner of the first aspect, the name node may instruct a data node to allocate a proper IO bandwidth to the first tenant. For example, the name node may instruct a data node to allocate an IO bandwidth to the first tenant according to a priority of the first tenant in order to satisfy an IO bandwidth requirement of the first tenant as much as possible.

In a second optional implementation manner of the first aspect, the at least one data node includes a first data node, an IO bandwidth allocated by the first data node to the first tenant according to an instruction of the name node is a first IO bandwidth, and the first IO bandwidth is an IO bandwidth that is in the at least one IO bandwidth and corresponding to the first data node.

After instructing, by the name node based on the IO bandwidth of each data node in the at least one data node and the IO bandwidth of the first tenant, the at least one data node to allocate at least one IO bandwidth to the first tenant, the method further includes determining, by the name node, that an IO bandwidth that is in the at least one IO bandwidth and that is used by the first tenant is at least one utilized bandwidth, where the at least one utilized bandwidth is in a one-to-one correspondence with the at least one IO bandwidth, and instructing, by the name node, the at least one data node to adjust a corresponding IO bandwidth in the at least one IO bandwidth, or instructing the first data node to adjust the first IO bandwidth, according to the at least one utilized bandwidth.

After the name node allocates the at least one IO bandwidth to the first tenant, the first tenant may not use all the at least one IO bandwidth, or the at least one IO bandwidth may not satisfy the IO bandwidth required by the first tenant, or there is a big difference of using the at least one IO bandwidth by the first tenant (for example, a part of the at least one IO bandwidth is entirely used by the first tenant, but the other part of the at least one IO bandwidth is rarely used by the first tenant). Therefore, the name node needs to instruct, according to the at least one utilized bandwidth that is in the at least one IO bandwidth and that is used by the first tenant, a corresponding data node (which may be one or more data nodes included in the at least one data node) to adjust the IO bandwidth allocated to the first tenant such that the name node can properly allocate an IO bandwidth to the first tenant.

In a third optional implementation manner of the first aspect, after instructing, by the name node based on the IO bandwidth of each data node in the at least one data node and the IO bandwidth of the first tenant, the at least one data node to allocate at least one IO bandwidth to the first tenant, the method further includes determining, by the name node, that an IO bandwidth that is in the at least one IO bandwidth and that is used by the first tenant is at least one utilized bandwidth, where the at least one utilized bandwidth is in a one-to-one correspondence with the at least one IO bandwidth, and instructing, by the name node, a second data node to allocate an IO bandwidth to the first tenant when a difference between the sum of the at least one IO bandwidth and a sum of the at least one utilized bandwidth is less than or equal to a first threshold, where the at least one data node does not include the second data node.

When the name node determines that the difference between the sum of the at least one IO bandwidth and the sum of the at least one utilized bandwidth that is in the at least one IO bandwidth and that is used by the first tenant is less than or equal to the first threshold, it indicates that an IO bandwidth actually used by the first tenant is very close to the IO bandwidth allocated by the at least one data node to the first tenant (i.e., the first tenant almost uses all the IO bandwidth allocated by the at least one data node to the first tenant). In this case, in order to preferentially ensure a service of the first tenant and enable the first tenant to have sufficient IO bandwidths, the name node may further instruct another data node (such as the second data node) other than the at least one data node in the distributed storage system to allocate an IO bandwidth to the first tenant, that is, the name node instructs to increase the IO bandwidth allocated to the first tenant.

In a fourth optional implementation manner of the first aspect, after instructing, by the name node based on the IO bandwidth of each data node in the at least one data node and the IO bandwidth of the first tenant, the at least one data node to allocate at least one IO bandwidth to the first tenant, the method further includes determining, by the name node, that an IO bandwidth that is in the at least one IO bandwidth and that is used by the first tenant is at least one utilized bandwidth, where the at least one utilized bandwidth is in a one-to-one correspondence with the at least one IO bandwidth, and instructing, by the name node, a third data node in the at least one data node to adjust an IO bandwidth allocated by the third data node to the first tenant to 0 when a difference between the sum of the at least one IO bandwidth and a sum of the at least one utilized bandwidth is greater than a first threshold.

When the name node determines that the difference between the sum of the at least one IO bandwidth and the sum of the at least one utilized bandwidth that is in the at least one IO bandwidth and that is used by the first tenant is greater than the first threshold, it indicates that an IO bandwidth actually used by the first tenant is far less than the IO bandwidth allocated by the at least one data node to the first tenant (i.e., the first tenant may use only a part of the IO bandwidth allocated by the at least one data node to the first tenant). In this case, in order to save an IO bandwidth (or to provide an IO bandwidth that is not used by the first tenant for another tenant for use), the name node may further instruct the third data node in the at least one data node to adjust the IO bandwidth allocated by the third data node to the first tenant to 0, that is, the name node instructs to decrease the IO bandwidth allocated to the first tenant.

In a fifth optional implementation manner of the first aspect, the at least one data node includes a first data node, an IO bandwidth allocated by the first data node to the first tenant according to an instruction of the name node is a first IO bandwidth, and the first IO bandwidth is an IO bandwidth that is in the at least one IO bandwidth and corresponding to the first data node.

After instructing, by the name node based on the IO bandwidth of each data node in the at least one data node and the IO bandwidth of the first tenant, the at least one data node to allocate at least one IO bandwidth to the first tenant, the method further includes determining, by the name node, an IO bandwidth that is in the first IO bandwidth and that is used by the first tenant, and instructing, according to the IO bandwidth that is in the first IO bandwidth and that is used by the first tenant, the first data node to adjust the first IO bandwidth.

According to the fifth optional implementation manner of the first aspect, the name node may instruct, in a unit of data node, a corresponding data node (for example, the first data node) to adjust, within the data node, an IO bandwidth allocated by the data node to the first tenant. In this way, the name node may instruct, according to an IO bandwidth actually used by the first tenant on each data node, a corresponding data node to provide a more proper IO bandwidth for the first tenant, and may satisfy an IO bandwidth requirement of the first tenant as much as possible.

In a sixth optional implementation manner of the first aspect, m tenants include the first tenant, and m is a positive integer.

A method for determining the IO bandwidth of the first tenant by the name node includes determining, by the name node, the IO bandwidth of the first tenant according to a weight of each tenant in the m tenants and a sum of the IO bandwidth of each data node in the at least one data node.

The name node may determine the IO bandwidth of the first tenant using a formula 1.

The formula 1 includes that the IO bandwidth of the first tenant=a weight of the first tenant/a sum of weights of all tenants to which the at least one data node allocates an IO bandwidth×the sum of the IO bandwidth of each data node in the at least one data node.

When allocating an IO bandwidth to a tenant using the formula 1, because the name node performs allocation according to a weight of each tenant, the IO bandwidth allocated to each tenant may evenly satisfy an IO bandwidth requirement of each tenant as much as possible.

According to a second aspect, another IO bandwidth control method is provided. The method is applied to a distributed file system, the distributed file system includes at least one data node, and the at least one data node includes a first data node. The method includes determining, by the first data node, an IO bandwidth of each data node in the at least one data node and an IO bandwidth of a first tenant, and allocating a first IO bandwidth to the first tenant according to the IO bandwidth of each data node in the at least one data node and the IO bandwidth of the first tenant. The first IO bandwidth is greater than 0 and is less than or equal to an IO bandwidth of the first data node.

According to the technical solution provided in the foregoing method, an IO bandwidth can be allocated to a tenant in this application such that a manner of allocating an IO bandwidth is relatively flexible.

The IO bandwidth of the tenant is shared by at least one user, and each user in the at least one user corresponds to at least one application. Therefore, multiple applications corresponding to the at least one user that belongs to the tenant may share the IO bandwidth allocated to the tenant. Even if the multiple applications may be different at different moments, the multiple applications still share the IO bandwidth allocated to the tenant such that utilization of an IO bandwidth in the distributed file system can be improved.

In comparison with the IO bandwidth control method shown in the first aspect, each data node may allocate an IO bandwidth to a tenant without an instruction of a name node in the IO bandwidth control method shown in the second aspect, thereby alleviating a burden of the name node, saving resources of the name node, and reducing overheads of the name node.

Further, because each data node does not need to allocate an IO bandwidth to a tenant according to an instruction of the name node, each data node may allocate an IO bandwidth to a tenant on the data node in real time, thereby improving real-time quality of controlling an IO bandwidth at a tenant level.

In a first optional implementation manner of the second aspect, the first IO bandwidth is less than or equal to the IO bandwidth of the first tenant, or the first IO bandwidth is less than or equal to a sum of the IO bandwidth of the first tenant and an extra bandwidth.

According to the first optional implementation manner of the second aspect, the first data node may allocate a proper IO bandwidth to the first tenant. For example, the first data node allocates an IO bandwidth to the first tenant according to a priority of the first tenant in order to satisfy an IO bandwidth requirement of the first tenant as much as possible.

In a second optional implementation manner of the second aspect, after allocating, by the first data node, a first IO bandwidth to the first tenant, the method further includes determining, by the first data node, an IO bandwidth that is used by the first tenant on the at least one data node is at least one utilized bandwidth, and adjusting, by the first data node, the first IO bandwidth according to the at least one utilized bandwidth.

After the first data node allocates the first IO bandwidth to the first tenant, the first tenant may not use all the first IO bandwidth, the first IO bandwidth may be less than the IO bandwidth required by the first tenant, or there is a big difference of using the first IO bandwidth by the first tenant (for example, a part of the first IO bandwidth is entirely used by the first tenant, but the other part of the first IO bandwidth is rarely used by the first tenant). Therefore, the first data node needs to adjust, according to an actual utilized bandwidth (further, the at least one utilized bandwidth) of the first tenant, the first IO bandwidth allocated by the first data node to the first tenant. In this way, the first data node can properly allocate an IO bandwidth to the first tenant.

In a third optional implementation manner of the second aspect, after allocating, by the first data node, a first IO bandwidth to the first tenant, the method further includes determining, by the first data node, an IO bandwidth that is in the first IO bandwidth and that is used by the first tenant, and adjusting, by the first data node, the first IO bandwidth according to the IO bandwidth that is in the first IO bandwidth and that is used by the first tenant.

After the first data node allocates the first IO bandwidth to the first tenant, the first data node may adjust the first IO bandwidth according to an IO bandwidth that is in the first IO bandwidth and that is actually used by the first tenant. In this way, the first data node can provide a proper IO bandwidth for the first tenant, and may satisfy an IO bandwidth requirement of the first tenant as much as possible.

In a fourth optional implementation manner of the second aspect, a method for determining the IO bandwidth of the first tenant by the first data node includes determining, by the first data node, the IO bandwidth of the first tenant according to a weight of each tenant in m tenants and a sum of the IO bandwidth of each data node in the at least one data node.

For specific description and technical effects of the fourth optional implementation manner of the second aspect, refer to related description of the sixth optional implementation manner of the first aspect. Details are not described herein again.

According to a third aspect, an IO access request processing method is provided. The method is applied to a distributed file system, the distributed file system includes at least one data node, and the at least one data node includes a first data node. The method includes receiving, by the first data node, an IO access request for accessing the distributed file system by a tenant, determining, according to the IO access request, the tenant corresponding to the IO access request, and determining, according to an IO bandwidth allocated by the first data node to the tenant, whether to delay responding to the IO access request.

The IO access request processing method provided in this application is applied to a distributed file system, the distributed file system includes at least one data node, and the at least one data node includes a first data node. In this method, the first data node receives an IO access request for accessing the distributed file system by a tenant, determines, according to the IO access request, the tenant corresponding to the IO access request, and then determines, according to an IO bandwidth allocated by the first data node to the tenant, whether to delay responding to the IO access request. In this application, an IO bandwidth can be allocated to a tenant on a data node, and then the data node may determine, according to the IO bandwidth allocated to the tenant, whether to delay responding to an IO access request corresponding to the tenant (further, in this application, the IO access request is certainly responded to, and the responding may be immediate responding or delayed responding) such that a success rate of responding to the IO access request can be increased.

In a first optional implementation manner of the third aspect, a method for determining, by the first data node according to the IO bandwidth allocated by the first data node to the tenant, whether to delay responding to the IO access request includes determining, by the first data node, a difference between the IO bandwidth allocated by the first data node to the tenant and an IO bandwidth used by the tenant on the first data node, and responding to the IO access request when determining that the difference is greater than a third threshold.

When the first data node determines that the difference between the IO bandwidth allocated by the first data node to the tenant and the IO bandwidth used by the tenant on the first data node is greater than the third threshold, it indicates that some idle IO bandwidths exist in the IO bandwidth allocated by the first data node to the tenant, that is, the first data node has sufficient IO bandwidths to respond to the IO access request for accessing the distributed file system by the tenant. In this case, the first data node may immediately respond to the IO access request.

In a second optional implementation manner of the third aspect, a method for determining, by the first data node according to the IO bandwidth allocated by the first data node to the tenant, whether to delay responding to the IO access request includes determining, by the first data node, a difference between the IO bandwidth allocated by the first data node to the tenant and an IO bandwidth used by the tenant on the first data node, and delaying responding to the IO access request when the difference is less than or equal to a third threshold.

When the first data node determines that the difference between the IO bandwidth allocated by the first data node to the tenant and the IO bandwidth used by the tenant on the first data node is less than or equal to the third threshold, it indicates that few idle IO bandwidths exist in the IO bandwidth allocated by the first data node to the tenant, that is, the first data node currently does not have sufficient IO bandwidths to respond to the IO access request for accessing the distributed file system by the tenant. In this case, the first data node may delay responding to the IO access request.

In a third optional implementation manner of the third aspect, before the first data node allocates the IO bandwidth to the tenant, the method further includes receiving, by the first data node, an instruction of a name node.

A method for allocating the IO bandwidth to the tenant by the first data node includes allocating, by the first data node, the IO bandwidth to the tenant according to the instruction of the name node.

Because the name node may instruct each data node to allocate an IO bandwidth to the tenant, the IO bandwidth can be properly allocated to the tenant.

In a fourth optional implementation manner of the third aspect, a method for determining, by the first data node according to the IO access request, the tenant corresponding to the IO access request includes determining, by the first data node according to a tenant identifier carried in the IO access request, the tenant corresponding to the IO access request.

In a fifth optional implementation manner of the third aspect, a file attribute of a file that belongs to the tenant and that is managed by the distributed file system includes a tenant identifier. The distributed file system manages the file that belongs to the tenant, and the file attribute of the file includes the tenant identifier of the tenant. In a scenario, the distributed file system manages files of different tenants, and a tenant to which a file belongs may be determined according to a tenant identifier included in a file attribute of the file.

A method for determining, by the first data node according to the IO access request, the tenant corresponding to the IO access request includes obtaining, by the first data node according to a file specified in the IO access request, a file attribute of the file specified in the IO access request, and determining, according to the tenant identifier included in the obtained file attribute, the tenant corresponding to the IO access request.

According to the foregoing two methods, after receiving the IO access request, the first data node may accurately determine the tenant corresponding to the IO access request, and then determine, according to the IO bandwidth allocated by the first data node to the tenant, whether to delay responding to the IO access request.

In a sixth optional implementation manner of the third aspect, the method further includes allocating, by the first data node, an IO bandwidth to each user in at least one user according to the IO bandwidth allocated by the first data node to the tenant and a weight of each user in the at least one user that uses the tenant.

The first data node allocates, using a formula 2 and based on the IO bandwidth allocated by the first data node to the tenant, the IO bandwidth to each user in the at least one user that uses the tenant.

The formula 2 includes that an IO bandwidth of a user=a weight of the user/a sum of weights of all users who use the tenant×the IO bandwidth allocated by the first data node to the tenant.

When allocating, using the formula 2, an IO bandwidth to each user that belongs to the tenant, because the first data node performs allocation according to a weight of each user, the IO bandwidth allocated to each user may evenly satisfy an IO bandwidth requirement of each user as much as possible.

In a seventh optional implementation manner of the third aspect, the method further includes allocating, by the first data node, an IO bandwidth to each client in at least one client according to a weight of each client in the at least one client and an IO bandwidth allocated by the first data node to a first user that starts the at least one client.

The first data node allocates, using a formula 3 and based on the IO bandwidth allocated by the first data node to the first user that starts the at least one client, the IO bandwidth to each client in the at least one client stated by the first user.

The formula 3 includes that an IO bandwidth of a client=a weight of the client/a sum of weights of all clients started by the first user×the IO bandwidth allocated by the first data node to the first user.

When allocating, using the formula 3, an IO bandwidth to each client to which a user logs in, because the first data node performs allocation according to a weight of each client, the IO bandwidth allocated to each client may evenly satisfy an IO bandwidth requirement of each client as much as possible.

According to a fourth aspect, a name node is provided. The name node is applied to a distributed file system, the distributed file system includes the name node and at least one data node, and the name node includes a determining unit and an instruction unit.

The determining unit is configured to determine an IO bandwidth of each data node in the at least one data node and an IO bandwidth of a first tenant. The instruction unit is configured to instruct, based on the IO bandwidth of each data node in the at least one data node and the IO bandwidth of the first tenant that are determined by the determining unit, the at least one data node to allocate at least one IO bandwidth to the first tenant. The at least one IO bandwidth is in a one-to-one correspondence with the at least one data node, each IO bandwidth in the at least one IO bandwidth is less than or equal to an IO bandwidth of a corresponding data node, and each IO bandwidth in the at least one IO bandwidth is greater than 0.

The name node provided in this application can allocate an IO bandwidth to a tenant such that a manner of allocating an IO bandwidth is relatively flexible.

The IO bandwidth of the tenant is shared by at least one user, and each user in the at least one user corresponds to at least one application. Therefore, multiple applications corresponding to the at least one user that belongs to the tenant may share the IO bandwidth allocated to the tenant. Even if the multiple applications may be different at different moments, the multiple applications still share the IO bandwidth allocated to the tenant such that utilization of an IO bandwidth in the distributed file system can be improved.

It should be noted that the name node provided in this application includes but is not limited to the determining unit and the instruction unit in the fourth aspect, and functions of the determining unit and the instruction unit in the fourth aspect include but are not limited to the foregoing described functions. It should be noted that the name node may include units and/or modules that are configured to perform the IO bandwidth control method described in the first aspect and the optional implementation manners of the first aspect. That the name node includes the determining unit and the instruction unit is merely an example, and the units and/or the modules are obtained after logical division is performed on the name node in order to perform the IO bandwidth control method described in the first aspect and the optional implementation manners of the first aspect.

For specific description of technical effects of various optional implementation manners of the fourth aspect, refer to related description of technical effects of the corresponding optional implementation manners of the first aspect. Details are not described herein again.

According to a fifth aspect, a data node is provided. The data node is applied to a distributed file system, the distributed file system includes at least one data node, and the at least one data node includes the data node. The data node includes a determining unit and an allocation unit.

The determining unit is configured to determine an IO bandwidth of each data node in the at least one data node and an IO bandwidth of a first tenant. The allocation unit is configured to allocate a first IO bandwidth to the first tenant according to the IO bandwidth of each data node in the at least one data node and the IO bandwidth of the first tenant that are determined by the determining unit. The first IO bandwidth is less than or equal to an IO bandwidth of a first data node, and the first IO bandwidth is greater than 0.

The data node provided in this application may allocate the first IO bandwidth to the first tenant such that a manner of allocating an IO bandwidth is relatively flexible.

The first IO bandwidth of the first tenant is shared by at least one user. Each user in the at least one user corresponds to at least one application. Therefore, multiple applications corresponding to the at least one user that belongs to the first tenant may share the first IO bandwidth allocated to the first tenant. Even if the multiple applications may be different at different moments, the multiple applications still share the first IO bandwidth allocated to the first tenant such that utilization of an IO bandwidth of the data node can be improved.

It should be noted that the data node provided in this application includes but is not limited to the determining unit and the allocation unit in the fifth aspect, and functions that the determining unit and the allocation unit in the fifth aspect have include but are not limited to the foregoing described functions. It should be noted that the data node may include units and/or modules that are configured to perform the IO bandwidth control method described in the second aspect and the optional implementation manners of the second aspect. That the data node includes the determining unit and the allocation unit is merely an example, and the units and/or the modules are obtained after logical division is performed on the data node in order to perform the IO bandwidth control method described in the second aspect and the optional implementation manners of the second aspect.

For specific description of technical effects of various optional implementation manners of the fifth aspect, refer to related description of technical effects of the corresponding optional implementation manners of the second aspect. Details are not described herein again.

According to a sixth aspect, another data node is provided. The data node is applied to a distributed file system, the distributed file system includes at least one data node, and the at least one data node includes the data node. The data node includes a receiving unit, a determining unit, and an allocation unit.

The receiving unit is configured to receive an IO access request for accessing the distributed file system by a tenant. The determining unit is configured to determine, according to the IO access request received by the receiving unit, the tenant corresponding to the IO access request, and determine, according to an IO bandwidth allocated by the allocation unit to the tenant, whether to delay responding to the IO access request.

The data node provided in this application is applied to a distributed file system, the distributed file system includes at least one data node, and the at least one data node includes the data node. The data node receives an IO access request for accessing the distributed file system by a tenant, determines, according to the IO access request, the tenant corresponding to the IO access request, and then determines, according to an IO bandwidth allocated by the data node to the tenant, whether to delay responding to the IO access request. In this application, an IO bandwidth can be allocated to a tenant on a data node, and then the data node may determine, according to the IO bandwidth allocated to the tenant, whether to delay responding to an IO access request corresponding to the tenant (further, in this embodiment of the present application, the IO access request is certainly responded to, and the responding may be immediate responding or delayed responding) such that a success rate of responding to the IO access request can be increased.

It should be noted that the data node provided in this application includes but is not limited to the receiving unit, the determining unit, and the allocation unit in the sixth aspect, and functions of the receiving unit, the determining unit, and the allocation unit in the sixth aspect include but are not limited to the foregoing described functions. It should be noted that the data node may include units and/or modules that are configured to perform the IO access request processing method described in the third aspect and the optional implementation manners of the third aspect. That the data node includes the receiving unit, the determining unit, and the allocation unit is merely an example, and the units and/or the modules are obtained after logical division is performed on the data node in order to perform the IO access request processing method described in the third aspect and the optional implementation manners of the third aspect.

For specific description of technical effects of various optional implementation manners of the sixth aspect, refer to related description of technical effects of the corresponding optional implementation manners of the third aspect. Details are not described herein again.

According to a seventh aspect, a name node is provided. The name node is applied to a distributed file system, and the distributed file system includes the name node and at least one data node. The name node includes at least one processor, an interface circuit, a memory, and a system bus.

The memory is configured to store a computer execution instruction. The at least one processor, the interface circuit, and the memory are interconnected using the system bus. When the name node runs, the at least one processor executes the computer execution instruction stored in the memory such that the name node performs the IO bandwidth control method shown in the first aspect or the optional implementation manners of the first aspect.

According to an eighth aspect, a computer readable storage medium is provided. The computer readable storage medium stores a computer execution instruction. When at least one processor of a name node executes the computer execution instruction, the name node performs the IO bandwidth control method shown in the first aspect or the optional implementation manners of the first aspect.

In addition, according to the eighth aspect, a computer program product is further provided. The computer program product includes a computer execution instruction, and the computer execution instruction is stored in a computer readable storage medium. At least one processor of a name node may read the computer execution instruction from the computer readable storage medium, and when the name node executes the computer execution instruction, the at least one processor performs the IO bandwidth control method shown in the first aspect or the optional implementation manners of the first aspect.

For specific description of technical effects of the seventh aspect and the eighth aspect, refer to related description of technical effects of the first aspect and the optional implementation manners of the first aspect. Details are not described herein again.

According to a ninth aspect, a data node is provided. The data node is applied to a distributed file system, the distributed file system includes at least one data node, and the at least one data node includes the data node. The data node includes at least one processor, an interface circuit, a memory, and a system bus.

The memory is configured to store a computer execution instruction. The at least one processor, the interface circuit, and the memory are interconnected using the system bus. When the data node runs, the at least one processor executes the computer execution instruction stored in the memory such that the data node performs the IO bandwidth control method shown in the second aspect or the optional implementation manners of the second aspect.

According to a tenth aspect, a computer readable storage medium is provided. The computer readable storage medium stores a computer execution instruction. When at least one processor of a data node executes the computer execution instruction, the data node performs the IO bandwidth control method shown in the second aspect or the optional implementation manners of the second aspect.

In addition, according to the tenth aspect, a computer program product is further provided. The computer program product includes a computer execution instruction, and the computer execution instruction is stored in a computer readable storage medium. At least one processor of a data node may read the computer execution instruction from the computer readable storage medium, and the at least one processor executes the computer execution instruction such that the data node performs the IO bandwidth control method shown in the second aspect or the optional implementation manners of the second aspect.

For specific description of technical effects of the ninth aspect and the tenth aspect, refer to related description of technical effects of the second aspect and the optional implementation manners of the second aspect. Details are not described herein again.

According to an eleventh aspect, another data node is provided. The data node is applied to a distributed file system, the distributed file system includes at least one data node, and the at least one data node includes the data node. The data node includes at least one processor, an interface circuit, a memory, and a system bus.

The memory is configured to store a computer execution instruction. The at least one processor, the interface circuit, and the memory are interconnected using the system bus. When the data node runs, the at least one processor executes the computer execution instruction stored in the memory such that the data node performs the IO access request processing method shown in the third aspect or the optional implementation manners of the third aspect.

According to a twelfth aspect, a computer readable storage medium is provided. The computer readable storage medium stores a computer execution instruction. When at least one processor of a data node executes the computer execution instruction, the data node performs the IO access request processing method shown in the third aspect or the optional implementation manners of the third aspect.

In addition, according to the twelfth aspect, a computer program product is further provided. The computer program product includes a computer execution instruction, and the computer execution instruction is stored in a computer readable storage medium. At least one processor of a data node may read the computer execution instruction from the computer readable storage medium, and the at least one processor executes the computer execution instruction such that the data node performs the IO access request processing method shown in the third aspect or the optional implementation manners of the third aspect.

For specific description of technical effects of the eleventh aspect and the twelfth aspect, refer to related description of technical effects of the third aspect and the optional implementation manners of the third aspect. Details are not described herein again.

According to a thirteenth aspect, a distributed file system is provided. The distributed file system includes a name node and at least one data node, and the name node is the name node described in the fourth aspect or the seventh aspect.

Alternatively, the distributed file system includes at least one data node, the at least one data node includes a first data node, and the first data node is the data node described in the fifth aspect or the ninth aspect.

Alternatively, the distributed file system includes at least one data node, the at least one data node includes a first data node, and the first data node is the data node described in the sixth aspect or the eleventh aspect.

For specific description of technical effects of the thirteenth aspect, refer to related description of technical effects of the fourth aspect, the seventh aspect, the fifth aspect, the ninth aspect, the sixth aspect, or the eleventh aspect. Details are not described herein again.

BRIEF DESCRIPTION OF DRAWINGS

To describe the technical solutions in the embodiments of the present application more clearly, the following briefly introduces the accompanying drawings required for describing the embodiments. The accompanying drawings in the following description show merely some embodiments of the present application.

DESCRIPTION OF EMBODIMENTS

Figure 1:
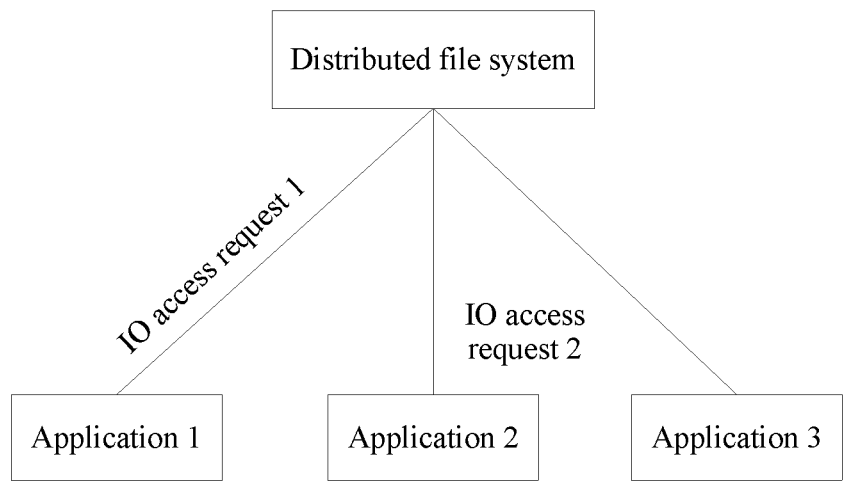
FIG. 1 is a schematic diagram of an architecture in which an application accesses a distributed file system.

The following describes in detail the technical solutions in the embodiments of the present application with reference to the accompanying drawings in the embodiments of the present application. The described embodiments are merely some but not all of the embodiments of the present application.

In the specification and claims of the present application, the terms "first," "second," "third," and the like are intended to distinguish between different objects but do not indicate a particular order of the objects. For example, a first data node, a second data node, and a third data node are intended to distinguish between different data nodes but do not indicate a particular order of the data nodes.

In the embodiments of the present application, the phrase "for example" is used to represent an example, an example illustration, or an illustration. Any embodiment or design solution that is described as "for example" in the embodiments of the present application should not be interpreted as better than other embodiments or design solutions. Precisely, the phrase "for example" is used to present a related concept in a specific manner.

In addition, the terms "include," "have," or any other variant thereof mentioned in descriptions of the present application are intended to cover a non-exclusive inclusion. For example, a process, a method, a system, a product, or a device that includes a series of steps or units is not limited to the listed steps or units, but optionally further includes another unlisted step or unit, or optionally further includes another inherent step or unit of the process, the method, the product, or the device.

A tenant is a logical concept that relates to a resource in a distributed file system. A tenant represents a quantity of resources that can be used in the distributed file system. For example, a tenant represents a quantity of IO bandwidths that can be used in the distributed file system.

A user refers to an account used to log in to a client.

An application refers to an application corresponding to a client to which a user logs in, for example, a database application corresponding to a database client to which a user logs in, or a web page application corresponding to a web page client to which a user logs in. The application corresponding to the client to which the user logs in may access a distributed file system using a tenant.

A user may log in to at least one client, that is, the user may be corresponding to at least one application. At least one user belongs to a tenant, that is, the at least one user may share an IO bandwidth of the tenant, or multiple applications corresponding to at least one user that belongs to a tenant may share an IO bandwidth of the tenant.

In the embodiments of the present application, an IO bandwidth is allocated from a perspective of a tenant. An IO bandwidth control method and an IO access request processing method are provided, and the methods are applied to a distributed file system.

According to one aspect, an embodiment of the present application provides an IO bandwidth control method. The method is applied to a distributed file system, and the distributed file system includes a name node and at least one data node. In this method, the name node determines an IO bandwidth of each data node in the at least one data node and an IO bandwidth of a first tenant, and instructs, according to the IO bandwidth of each data node in the at least one data node and the IO bandwidth of the first tenant, the at least one data node to allocate at least one IO bandwidth to the first tenant. Therefore, in this embodiment of the present application, an IO bandwidth can be allocated to a tenant such that a manner of allocating an IO bandwidth is relatively flexible.

In addition, in other approaches, when each new application accesses a distributed file system, the distributed file system allocates a new IO bandwidth to the new application, thereby causing relatively low utilization of an IO bandwidth in the distributed file system. However, in this embodiment of the present application, after an IO bandwidth is allocated to a tenant, multiple applications corresponding to at least one user that belongs to the tenant may share the IO bandwidth allocated to the tenant. Even if the multiple applications may be different at different moments, for example, a new application is added, these applications still share the IO bandwidth allocated to the tenant, that is, allocating another IO bandwidth to the newly added application as the other approaches does not occur. Therefore, utilization of an IO bandwidth in the distributed file system can be improved.

According to another aspect, an embodiment of the present application provides another IO bandwidth control method. The method is applied to a distributed file system, the distributed file system includes at least one data node, and the at least one data node includes a first data node. In this method, the first data node determines an IO bandwidth of each data node in the at least one data node and an IO bandwidth of a first tenant, and allocates a first IO bandwidth to the first tenant according to the IO bandwidth of each data node in the at least one data node and the IO bandwidth of the first tenant. Therefore, in this embodiment of the present application, an IO bandwidth can be allocated to a tenant such that a manner of allocating an IO bandwidth is relatively flexible. In this embodiment of the present application, an IO bandwidth can be allocated to a tenant, and multiple applications corresponding to at least one user that belongs to the tenant may share the IO bandwidth allocated to the tenant. Even if the multiple applications may be different at different moments, for example, a new application is added, these applications still share the IO bandwidth allocated to the tenant, that is, allocating another IO bandwidth to the newly added application as the other approaches does not occur. Therefore, utilization of an IO bandwidth in the distributed file system can be improved.

According to still another aspect, an embodiment of the present application provides an IO access request processing method. A distributed file system to which the method is applied includes at least one data node, and the at least one data node includes a first data node. According to the IO access request processing method provided in this embodiment of the present application, the first data node receives an IO access request for accessing the distributed file system by a tenant, determines, according to the IO access request, the tenant corresponding to the IO access request, and then determines, according to an IO bandwidth allocated by the first data node to the tenant, whether to delay responding to the IO access request. Therefore, in this embodiment of the present application, an IO bandwidth can be allocated to a tenant on a data node, and then the data node may determine, according to the IO bandwidth allocated to the tenant, whether to delay responding to an IO access request corresponding to the tenant (further, in this application, the IO access request is certainly responded to, and the responding may be immediate responding or delayed responding) such that a success rate of responding to the IO access request can be increased.

Figure 2:
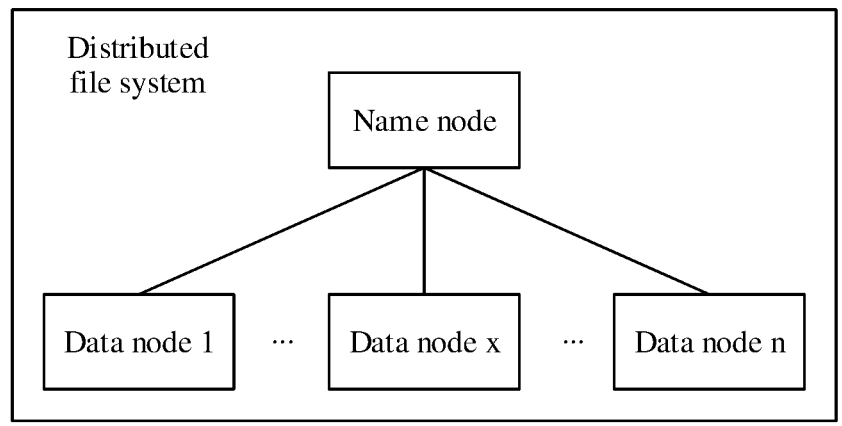
FIG. 2 is a schematic diagram of an architecture of a distributed file system according to an embodiment of the present application.

The IO bandwidth control method and the IO access request processing method that are provided in the embodiments of the present application may be applied to the distributed file system. As shown in FIG. 2, FIG. 2 is a schematic diagram of an architecture of a distributed file system according to an embodiment of the present application. In FIG. 2, the distributed file system includes a name node and at least one data node connected to the name node.

Optionally, the distributed file system shown in FIG. 2 may further include an IO recording module (not shown) and a tenant management module (not shown). The IO recording module and the tenant management module may be disposed on the name node and/or the at least one data node.

Figure 3:
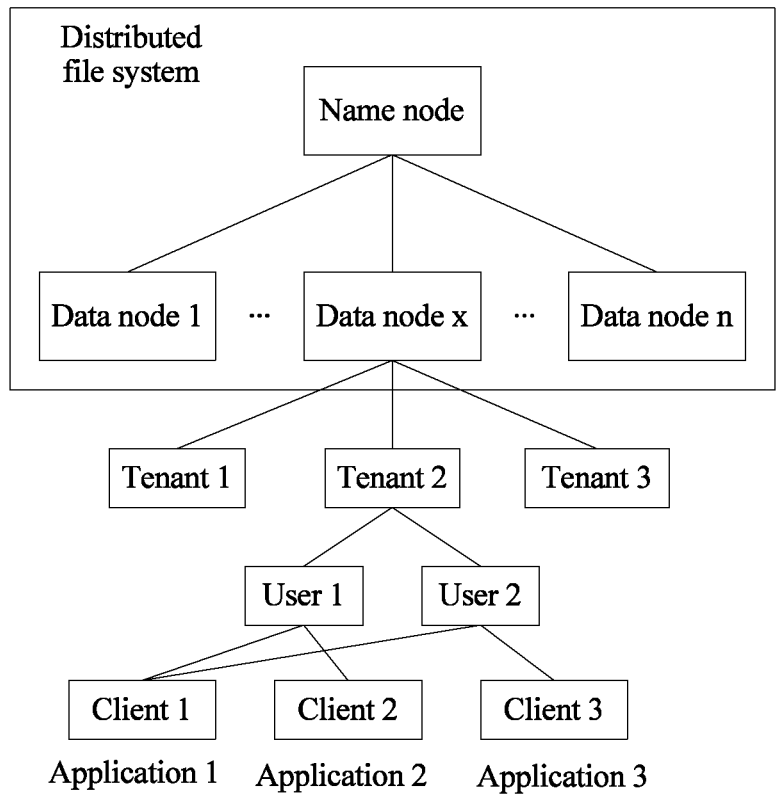
FIG. 3 is a schematic diagram of an architecture in which an application accesses a distributed file system according to an embodiment of the present application.

With reference to FIG. 2, as shown in FIG. 3, FIG. 3 is a schematic diagram of an architecture in which an application accesses a distributed file system. In FIG. 3, at least one data node (for example, n data nodes, where n is a positive integer) in the distributed file system is respectively a data node 1, . . . , a data node x, . . . , and a data node n. In an actual storage system, a data node allocates an IO bandwidth to at least one tenant, and an IO bandwidth of a tenant is allocated to at least one user that belongs to the tenant for use. In FIG. 3, an IO bandwidth of a tenant 2 is allocated to a user 1 and a user 2 that belong to the tenant 2 for use. A user may log in to at least one client, and both a client 1 and a client 2 in FIG. 3 are clients to which the user 1 logs in. In FIG. 3, each application corresponds to one client. For example, an application 1 corresponds to the client 1, an application 2 corresponds to the client 2, and an application 3 corresponds to a client 3. All the application 1, the application 2, and the application 3 can access the distributed file system. It should be noted that the application 1, the application 2, and the application 3 may be a same application, or two of the application 1, the application 2, and the application 3 are a same application, or all the application 1, the application 2, and the application 3 are different applications. Other data nodes in FIG. 3 are similar to the data node x. Details are not described herein again.

FIG. 2 is merely an example of the architecture of the distributed file system according to an embodiment of the present application, and FIG. 3 is merely an example of the architecture in which the application accesses the distributed file system according to an embodiment of the present application. Further, specific implementation of the distributed file system and specific implementation of accessing the distributed file system by the application may be determined according to an actual use requirement. This is not limited in the present application.

Figure 4:
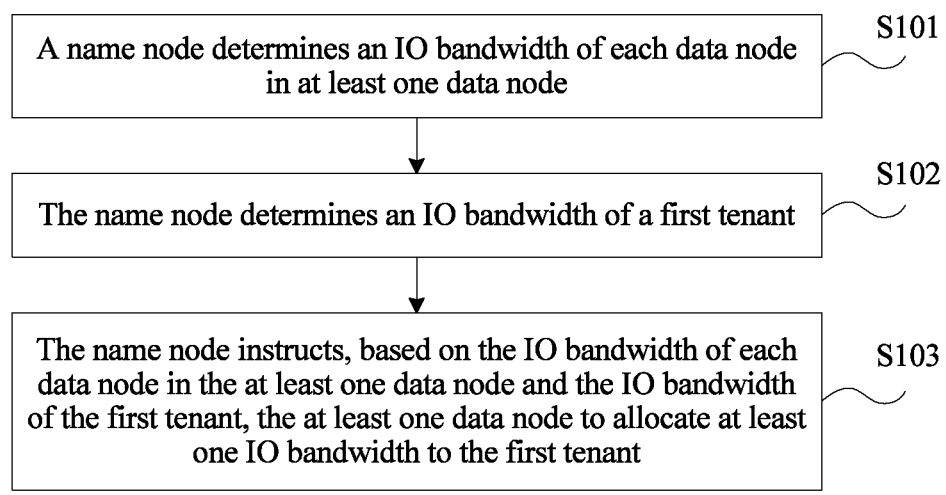
FIG. 4 is a flowchart of an IO bandwidth control method according to an embodiment of the present application.

An embodiment of the present application provides an IO bandwidth control method. The method is applied to a distributed file system, and the distributed file system may be the distributed file system shown in FIG. 2 or FIG. 3. The distributed file system includes a name node and at least one data node. As shown in FIG. 4, the method includes the following steps.

Step S101: The name node determines an IO bandwidth of each data node in the at least one data node.

The IO bandwidth of each data node is an IO bandwidth that can be allocated by each data node. Hence, an IO bandwidth of a data node refers to IO bandwidths that the data node has in total, and the IO bandwidth can be allocated by the data node.

Step S102: The name node determines an IO bandwidth of a first tenant.

The IO bandwidth of the first tenant is an IO bandwidth required by the first tenant.

For example, when the first tenant requests an IO bandwidth from the name node, the name node may directly set the IO bandwidth of the first tenant. For example, the name node sets the IO bandwidth of the first tenant according to an empirical value or according to a value of the IO bandwidth requested by the first tenant.

For example, when multiple tenants request IO bandwidths from the name node, the name node considers both a priority of each tenant and an IO bandwidth requested by each tenant, and adjusts the IO bandwidth required by each tenant. For example, the name node adjusts the IO bandwidth required by the first tenant.

Step S103: The name node instructs, based on the IO bandwidth of each data node in the at least one data node and the IO bandwidth of the first tenant, the at least one data node to allocate at least one IO bandwidth to the first tenant.

The at least one IO bandwidth is in a one-to-one correspondence with the at least one data node, each IO bandwidth in the at least one IO bandwidth is less than or equal to an IO bandwidth of a corresponding data node, and each IO bandwidth in the at least one IO bandwidth is greater than 0. Further, each of the at least one data node allocates an IO bandwidth to the first tenant according to an instruction of the name node, and the IO bandwidth allocated by each data node to the first tenant is greater than 0 and is less than an IO bandwidth of the data node.

For example, it is assumed that the at least one data node includes three data nodes, that is, the distributed file system includes three data nodes, and the three data nodes are respectively a data node 1, a data node 2, and a data node 3. After the name node determines IO bandwidths of the three data nodes and the IO bandwidth of the first tenant, the name node may instruct, based on an IO bandwidth of each data node in the three data nodes and the IO bandwidth of the first tenant, each of the three data nodes to allocate an IO bandwidth to the first tenant such that the first tenant obtains three IO bandwidths. For example, the name node may instruct, based on the IO bandwidth of each data node in the three data nodes and the IO bandwidth of the first tenant, the data node 1 to allocate an IO bandwidth 1 to the first tenant, the data node 2 to allocate an IO bandwidth 2 to the first tenant, and the data node 3 to allocate an IO bandwidth 3 to the first tenant.

According to the IO bandwidth control method provided in this embodiment of the present application, an IO bandwidth can be allocated to a tenant such that a manner of allocating an IO bandwidth is relatively flexible.

The IO bandwidth of the tenant is shared by at least one user, and each user in the at least one user corresponds to at least one application. Therefore, multiple applications corresponding to the at least one user that belongs to the tenant may share the IO bandwidth allocated to the tenant. Even if the multiple applications may be different at different moments, the multiple applications still share the IO bandwidth allocated to the tenant such that utilization of an IO bandwidth in the distributed file system can be improved.

Optionally, in this embodiment of the present application, a sum of the at least one IO bandwidth is less than or equal to the IO bandwidth of the first tenant, or a sum of the at least one IO bandwidth is less than or equal to a sum of the IO bandwidth of the first tenant and an extra bandwidth.

For example, the IO bandwidth required by the first tenant may be relatively large, and the name node may not be capable of allocating sufficient IO bandwidths to the first tenant. Therefore, the sum of the at least one IO bandwidth is less than or equal to the IO bandwidth required by the first tenant, that is, the IO bandwidth of the first tenant.

For example, because a service priority of the first tenant may be relatively high, the name node needs to preferentially ensure the IO bandwidth required by the first tenant. Therefore, the name node may allocate an extra bandwidth to the first tenant in addition to allocating the IO bandwidth required by the first tenant to the first tenant in order to preferentially ensure the IO bandwidth required by the first tenant. Therefore, the sum of the at least one IO bandwidth may be greater than or equal to the IO bandwidth required by the first tenant (i.e., the IO bandwidth of the first tenant), and is less than or equal to the sum of the IO bandwidth of the first tenant and the extra bandwidth. The extra bandwidth may be a bandwidth greater than 0.

The name node may instruct a data node to allocate a proper IO bandwidth to the first tenant in order to satisfy an IO bandwidth requirement of the first tenant as much as possible.

Optionally, in the IO bandwidth control method provided in this embodiment of the present application, the at least one data node includes a first data node, an IO bandwidth allocated by the first data node to the first tenant according to an instruction of the name node is a first IO bandwidth, and the first IO bandwidth is an IO bandwidth that is in the at least one IO bandwidth and corresponding to the first data node.

Figure 5:
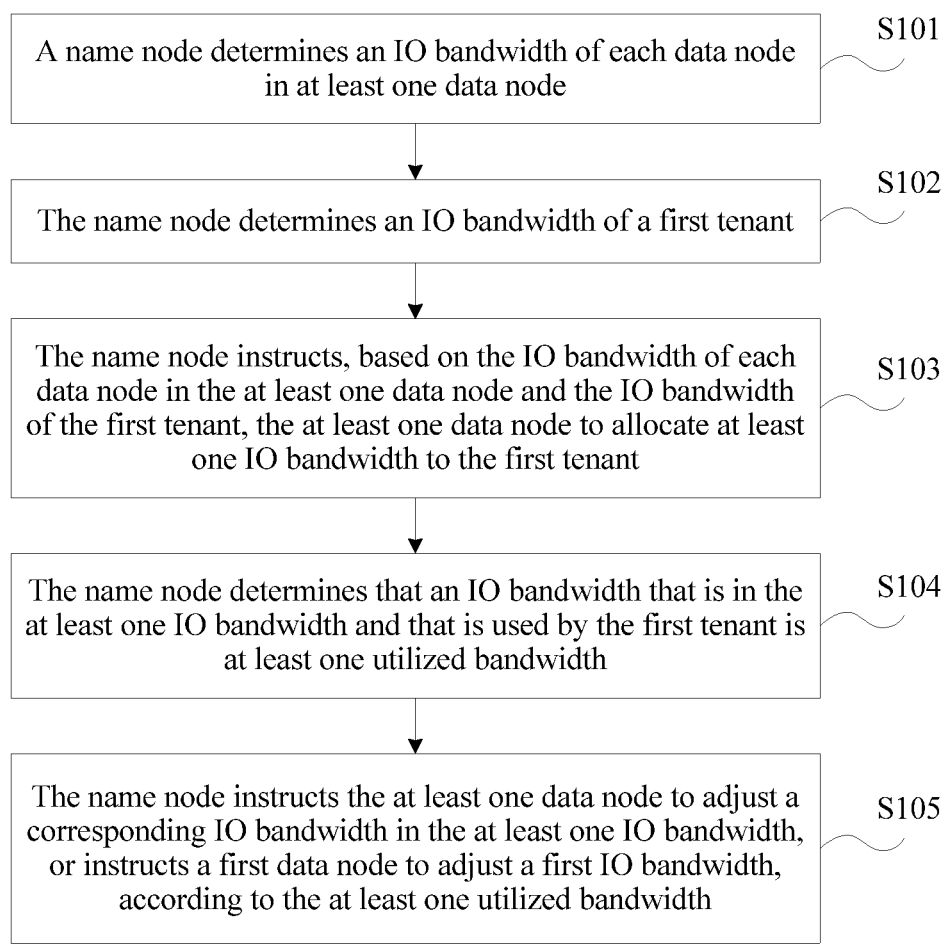
FIG. 5 is a flowchart of an IO bandwidth control method according to an embodiment of the present application.

With reference to FIG. 4, as shown in FIG. 5, after step S103, the IO bandwidth control method provided in this embodiment of the present application may further include the following steps.

Step S104: The name node determines that an IO bandwidth that is in the at least one IO bandwidth and that is used by the first tenant is at least one utilized bandwidth.

The at least one utilized bandwidth is in a one-to-one correspondence with the at least one IO bandwidth.

For each data node in the at least one data node, the data node allocates an IO bandwidth to the first tenant according to an instruction of the name node, and the data node may respond to an IO access request of the first tenant using the IO bandwidth. However, for a particular time point, an IO bandwidth (a utilized bandwidth) actually used to respond to the IO access request of the first tenant is fixed, and the IO bandwidth may be less than the IO bandwidth allocated by the data node to the first tenant, or may be equal to the IO bandwidth allocated by the data node to the first tenant. By analogy, at this time point, the first tenant has a utilized bandwidth at each data node.

For example, assuming that the at least one data node includes three data nodes, and the at least one IO bandwidth is an IO bandwidth 1, an IO bandwidth 2, and an IO bandwidth 3, the name node determines that IO bandwidths that are in the three IO bandwidths and that are used by the first tenant are three utilized bandwidths. For example, an IO bandwidth that is in the IO bandwidth 1 and that is used is a utilized bandwidth 1, an IO bandwidth that is in the IO bandwidth 2 and that is used is a utilized bandwidth 2, and an IO bandwidth that is in the IO bandwidth 3 and that is used is a utilized bandwidth 3. A utilized bandwidth that is in an IO bandwidth and that is used by the first tenant is less than or equal to an IO bandwidth of a data node that allocates the IO bandwidth.

Step S105: The name node instructs the at least one data node to adjust a corresponding IO bandwidth in the at least one IO bandwidth, or instructs a first data node to adjust a first IO bandwidth, according to the at least one utilized bandwidth.

After the name node allocates the at least one IO bandwidth to the first tenant, because the first tenant may not use all the at least one IO bandwidth, or the at least one IO bandwidth may be less than the IO bandwidth required by the first tenant, the name node needs to instruct, according to the at least one utilized bandwidth that is in the at least one IO bandwidth and that is used by the first tenant, a corresponding data node to adjust the IO bandwidth allocated to the first tenant. In this way, the name node can properly allocate the IO bandwidth to the first tenant.

Optionally, the name node may instruct, according to the at least one utilized bandwidth that is in the at least one IO bandwidth and that is used by the first tenant, the at least one data node to adjust a corresponding IO bandwidth in the at least one IO bandwidth. Alternatively, the name node may instruct, according to the at least one utilized bandwidth that is in the at least one IO bandwidth and that is used by the first tenant, the first data node to adjust the first IO bandwidth (i.e., the IO bandwidth allocated by the first data node to the first tenant).

In this embodiment, the at least one data node may include one or more first data nodes, and a specific quantity of first data nodes may be determined according to an actual use requirement. This is not limited in the present application. According to the foregoing method, the name node may instruct, according to the at least one utilized bandwidth that is in the at least one IO bandwidth and that is used by the first tenant, at least one data node in the at least one data node to adjust an IO bandwidth allocated by the data node to the first tenant. For example, the name node may adjust, by executing at least one of the following (1), (2), or (3), the IO bandwidth allocated to the first tenant.

(1): Instructing the data node 1 to adjust the IO bandwidth 1 allocated by the data node 1 to the first tenant.

(2): Instructing the data node 2 to adjust the IO bandwidth 2 allocated by the data node 2 to the first tenant.

(3): Instructing the data node 3 to adjust the IO bandwidth 3 allocated by the data node 3 to the first tenant.

According to the foregoing method, after the name node instructs the at least one data node to allocate the at least one IO bandwidth to the first tenant, the name node may instruct, according to the at least one utilized bandwidth that is in the at least one IO bandwidth and that is used by the first tenant, a corresponding data node to adjust an IO bandwidth allocated by the corresponding data node to the first tenant. For example, if the at least one utilized bandwidth that is in the at least one IO bandwidth and that is used by the first tenant is relatively large (for example, a difference between the sum of the at least one IO bandwidth and a sum of the at least one utilized bandwidth is less than or equal to a threshold), the name node instructs the corresponding data node to increase the IO bandwidth allocated by the corresponding data node to the first tenant. If the at least one utilized bandwidth that is in the at least one IO bandwidth and that is used by the first tenant is relatively small (for example, a difference between the sum of the at least one IO bandwidth and a sum of the at least one utilized bandwidth is greater than a threshold), the name node instructs the corresponding data node to decrease the IO bandwidth allocated by the corresponding data node to the first tenant. In this way, the name node can provide a proper IO bandwidth for the first tenant, and may satisfy an IO bandwidth requirement of the first tenant as much as possible.

Figure 6:
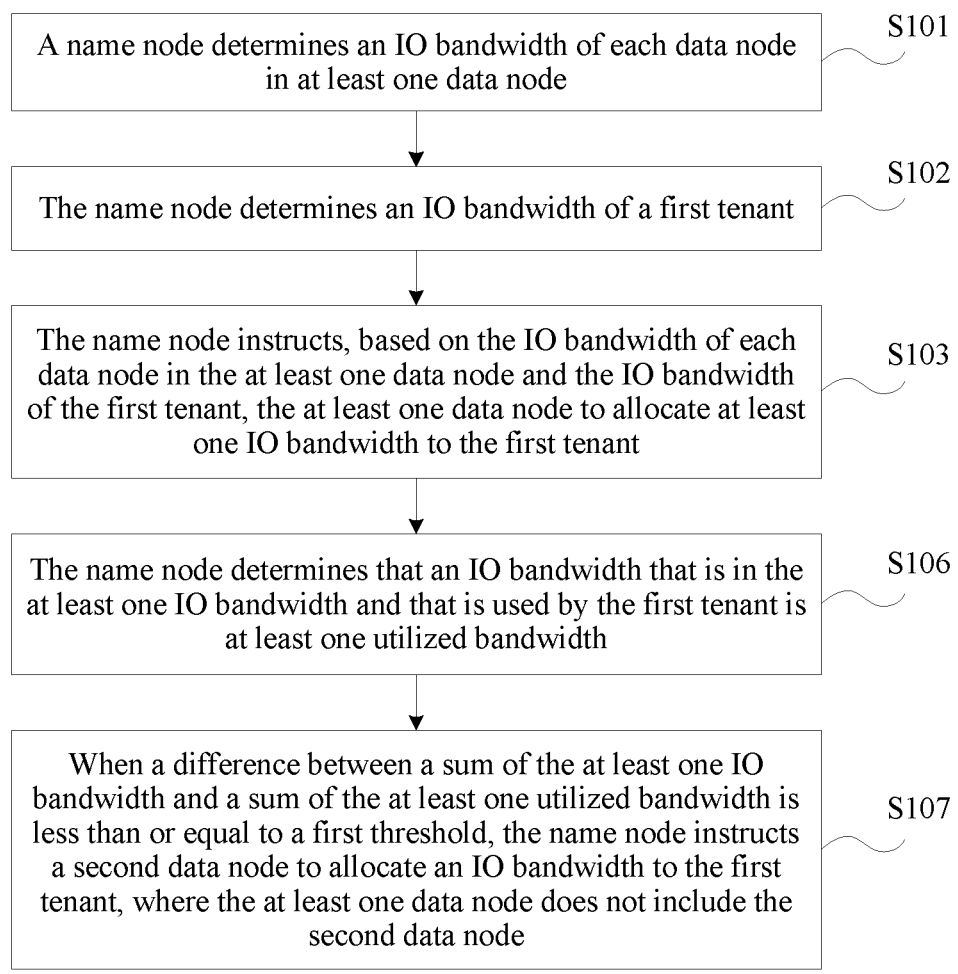
FIG. 6 is a flowchart of an IO bandwidth control method according to an embodiment of the present application.

Optionally, with reference to FIG. 4, as shown in FIG. 6, after step S103, the IO bandwidth control method provided in this embodiment of the present application may further include the following steps.

Step S106: The name node determines that an IO bandwidth that is in the at least one IO bandwidth and that is used by the first tenant is at least one utilized bandwidth.

The at least one utilized bandwidth is in a one-to-one correspondence with the at least one IO bandwidth.

For specific description of the at least one utilized bandwidth, refer to related description of the at least one utilized bandwidth in step S104. Details are not described herein again.

Step S107: When a difference between a sum of the at least one IO bandwidth and a sum of the at least one utilized bandwidth is less than or equal to a first threshold, the name node instructs a second data node to allocate an IO bandwidth to the first tenant, where the at least one data node does not include the second data node.

After the name node instructs the at least one data node to allocate the at least one IO bandwidth to the first tenant, the name node determines the at least one utilized bandwidth that is in the at least one IO bandwidth and that is used by the first tenant. When the difference between the sum of the at least one IO bandwidth and the sum of the at least one utilized bandwidth is less than or equal to the first threshold, it indicates that an IO bandwidth actually used by the first tenant is very close to the IO bandwidth allocated by the at least one data node to the first tenant (i.e., the first tenant almost uses all the IO bandwidth allocated by the at least one data node to the first tenant). In this case, in order to preferentially ensure a service of the first tenant and enable the first tenant to have sufficient IO bandwidths, the name node may further instruct another data node (such as the second data node) other than the at least one data node in the distributed storage system to allocate an IO bandwidth to the first tenant, that is, the name node instructs to increase the IO bandwidth allocated to the first tenant.

For example, it is assumed that, in the foregoing three IO bandwidths, the IO bandwidth 1 is 20 megabits per second (Mbit/s), the IO bandwidth 2 is 30 Mbit/s, and the IO bandwidth 3 is 50 Mbit/s, and in three utilized bandwidths in the foregoing three IO bandwidths, a utilized bandwidth 1 is 20 Mbit/s, a utilized bandwidth 2 is 30 Mbit/s, and a utilized bandwidth 3 is 40 Mbit/s. If the first threshold is 20 Mbit/s, a difference between a sum of the three IO bandwidths and a sum of the three utilized bandwidths is less than the first threshold. Therefore, the name node may instruct the second data node other than the at least one data node in the distributed storage system to allocate the IO bandwidth to the first tenant.

The second data node may be one data node, or may be multiple data nodes. Further, a quantity of second data nodes may be determined according to an actual use requirement. This is not limited in the present application.

FIG. 2 is merely described for illustration purposes using an example in which the distributed storage system includes at least one data node. In actual application, the distributed storage system may include more data nodes. This is not limited in the present application.

Figure 7:
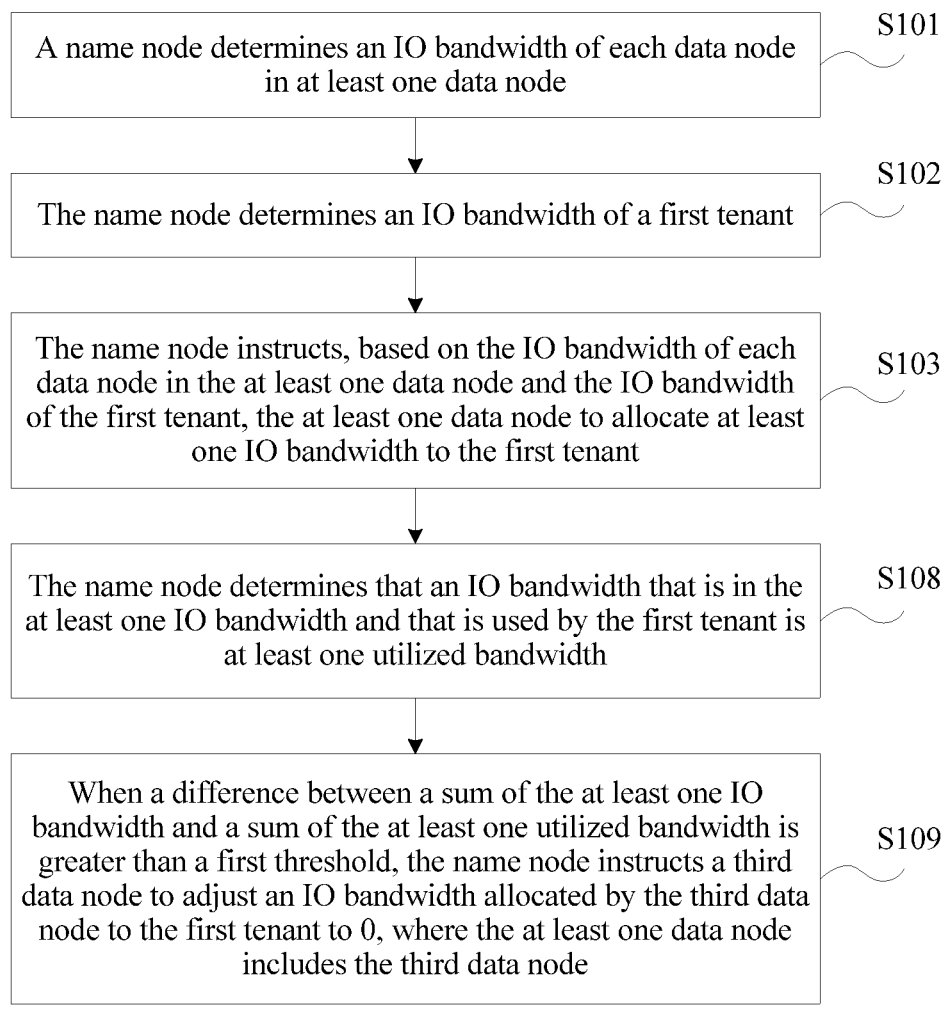
FIG. 7 is a flowchart of an IO bandwidth control method according to an embodiment of the present application.

Optionally, with reference to FIG. 4, as shown in FIG. 7, after step S103, the IO bandwidth control method provided in this embodiment of the present application may further include the following steps.

Step S108: The name node determines that an IO bandwidth that is in the at least one IO bandwidth and that is used by the first tenant is at least one utilized bandwidth.

The at least one utilized bandwidth is in a one-to-one correspondence with the at least one IO bandwidth.

For specific description of the at least one utilized bandwidth, refer to related description of the at least one utilized bandwidth in step S104. Details are not described herein again.

Step S109: When a difference between a sum of the at least one IO bandwidth and a sum of the at least one utilized bandwidth is greater than a first threshold, the name node instructs a third data node to adjust an IO bandwidth allocated by the third data node to the first tenant to 0, where the at least one data node includes the third data node.

After the name node instructs the at least one data node to allocate the at least one IO bandwidth to the first tenant, the name node determines the at least one utilized bandwidth that is in the at least one IO bandwidth and that is used by the first tenant. When the difference between the sum of the at least one IO bandwidth and the sum of the at least one utilized bandwidth is greater than the first threshold, it indicates that an IO bandwidth actually used by the first tenant is far less than the IO bandwidth allocated by the at least one data node to the first tenant (i.e., the first tenant may use only a part of the IO bandwidth allocated by the at least one data node to the first tenant). In this case, in order to save an IO bandwidth (or to provide an IO bandwidth that is not used by the first tenant for another tenant for use), the name node may further instruct the third data node in the at least one data node to adjust the IO bandwidth allocated by the third data node to the first tenant to 0, that is, the name node instructs to decrease the IO bandwidth allocated to the first tenant.

For example, it is assumed that, in the foregoing three IO bandwidths, the IO bandwidth 1 is 20 Mbit/s, the IO bandwidth 2 is 30 Mbit/s, and the IO bandwidth 3 is 50 Mbit/s, and in three utilized bandwidths in the foregoing three IO bandwidths, a utilized bandwidth 1 is 20 Mbit/s, a utilized bandwidth 2 is 20 Mbit/s, and a utilized bandwidth 3 is 0 Mbit/s. If the first threshold is 20 Mbit/s, a difference between a sum of the three IO bandwidths and a sum of the three utilized bandwidths is greater than the first threshold. Therefore, the name node may instruct the third data node (for example, a data node that allocates the IO bandwidth 3 to the first tenant) in the at least one data node to adjust the IO bandwidth allocated by the third data node to the first tenant to 0.

The third data node may be one data node, or may be multiple data nodes. Further, a quantity of third data nodes may be determined according to an actual use requirement. This is not limited in the present application.

Optionally, in the IO bandwidth control method provided in this embodiment of the present application, the at least one data node includes a first data node, an IO bandwidth allocated by the first data node to the first tenant according to an instruction of the name node is a first IO bandwidth, and the first IO bandwidth is an IO bandwidth that is in the at least one IO bandwidth and that corresponds to the first data node.

Figure 8:
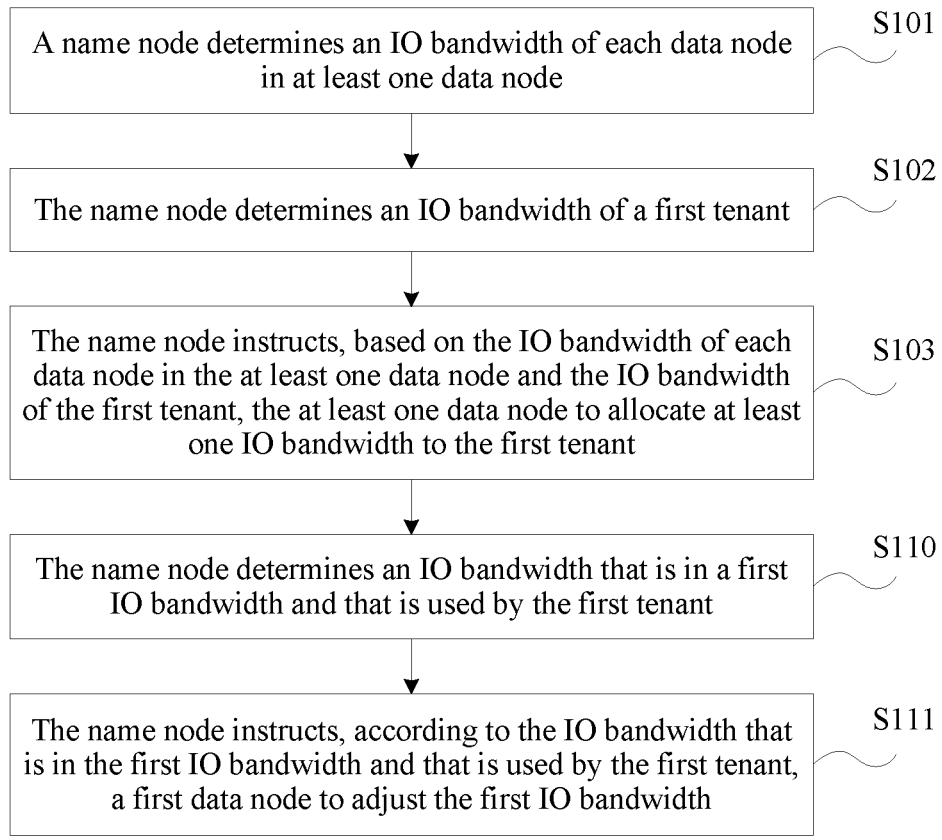
FIG. 8 is a flowchart of an IO bandwidth control method according to an embodiment of the present application.

With reference to FIG. 4, as shown in FIG. 8, after step S103, the method may further include the following steps.

Step S110: The name node determines an IO bandwidth that is in a first IO bandwidth and that is used by the first tenant.

Step S111: The name node instructs, according to the IO bandwidth that is in the first IO bandwidth and that is used by the first tenant, a first data node to adjust the first IO bandwidth.

For specific description of the IO bandwidth that is in the first IO bandwidth and that is used by the first tenant (an IO bandwidth that is in the first IO bandwidth and that is used by the first tenant), refer to related description of the at least one utilized bandwidth in step S104. Details are not described herein again.

After the name node instructs the at least one data node to allocate the at least one IO bandwidth to the first tenant, the name node may determine the IO bandwidth that is in the first IO bandwidth (the IO bandwidth allocated by the first data node in the at least one data node to the first tenant) and that is used by the first tenant, and then the name node instructs, according to the IO bandwidth that is in the first IO bandwidth and that is used by the first tenant, the first data node to adjust the first IO bandwidth. For example, if the IO bandwidth that is in the first IO bandwidth and that is used by the first tenant is relatively large (for example, greater than a threshold), the name node instructs the first data node to increase the first IO bandwidth. If the IO bandwidth that is in the first IO bandwidth and that is used by the first tenant is relatively small (for example, less than or equal to a threshold), the name node instructs the first data node to decrease the first IO bandwidth. In this way, the name node can provide a proper IO bandwidth for the first tenant, and may satisfy an IO bandwidth requirement of the first tenant as much as possible.

According to the method shown in FIG. 8, the name node may instruct, in a unit of data node, a corresponding data node (for example, the first data node) to adjust, within the data node, an IO bandwidth allocated by the data node to the first tenant. In this way, the name node may instruct, according to an IO bandwidth actually used by the first tenant on each data node, a corresponding data node to provide a more proper IO bandwidth for the first tenant, and may satisfy an IO bandwidth requirement of the first tenant as much as possible.

Optionally, in the IO bandwidth control method provided in this embodiment of the present application, the first tenant is a tenant in m tenants (further, the m tenants include the first tenant), the m tenants are tenants to which the name node allocates an IO bandwidth, and m is a positive integer. Step S102 may include the following step.

Step S102a: The name node determines the IO bandwidth of the first tenant according to a weight of each tenant in m tenants and a sum of the IO bandwidth of each data node in the at least one data node.

The weight of each tenant may be determined according to a service priority of each tenant and/or an IO bandwidth required by a service of the tenant. Further, a higher service priority of a tenant indicates a larger weight of the tenant, and a larger IO bandwidth required by a service of a tenant indicates a larger weight of the tenant. Optionally, when a weight of a tenant is determined according to a service priority of the tenant and an IO bandwidth required by a service of the tenant, a weight (such as a weight 1) may be preferentially determined according to the service priority of the tenant, then based on the weight, the weight is accordingly adjusted according to the IO bandwidth required by the service of the tenant, and an adjusted weight (such as a weight 2) is determined as the weight of the tenant. In this way, the determined weight of the tenant is relatively accurate.

Optionally, the name node may determine the IO bandwidth of the first tenant using a formula 1.

The formula 1 includes that the IO bandwidth of the first tenant=a weight of the first tenant/a sum of weights of all tenants to which the at least one data node allocates an IO bandwidth×the sum of the IO bandwidth of each data node in the at least one data node.

For example, it is assumed that m=3, that is, there are three tenants to which the at least one data node allocates an IO bandwidth, and the three tenants are respectively a tenant 1, a tenant 2, and a tenant 3, a weight of the tenant 1 is 1, a weight of the tenant 2 is 2, and a weight of the tenant 3 is 3, and the sum of the IO bandwidths of the data nodes in the at least one data node is M.

An IO bandwidth of the tenant 1=the weight of the tenant 1/(the weight of the tenant 1+the weight of the tenant 2+the weight of the tenant 3)×the sum of the IO bandwidth of each data node in the at least one data node=1/(1+2+3)×M=M/6.

An IO bandwidth of the tenant 2=the weight of the tenant 2/(the weight of the tenant 1+the weight of the tenant 2+the weight of the tenant 3)×the sum of the IO bandwidth of each data node in the at least one data node=2/(1+2+3)×M=M/3.

An IO bandwidth of the tenant 3=the weight of the tenant 3/(the weight of the tenant 1+the weight of the tenant 2+the weight of the tenant 3)×the sum of the IO bandwidth of each data node in the at least one data node=3/(1+2+3)×M=M/2.

When allocating an IO bandwidth to a tenant using the formula 1, because the name node performs allocation according to a weight of each tenant, the IO bandwidth allocated to each tenant may evenly satisfy an IO bandwidth requirement of each tenant as much as possible.

Figure 9:
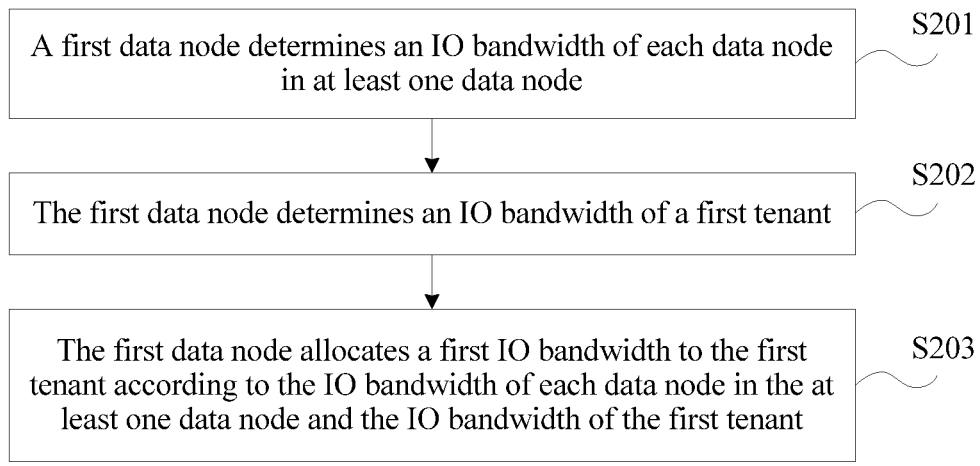
FIG. 9 is a flowchart of another IO bandwidth control method according to an embodiment of the present application.

An embodiment of the present application provides another IO bandwidth control method. The method is applied to a distributed file system, and the distributed file system may be the distributed file system shown in FIG. 2 or FIG. 3. The distributed file system includes at least one data node, and the at least one data node includes a first data node. As shown in FIG. 9, the method includes the following steps.

Step S201: The first data node determines an IO bandwidth of each data node in the at least one data node.

The IO bandwidth of each data node is an IO bandwidth that can be allocated by each data node. Hence, an IO bandwidth of a data node refers to IO bandwidths that the data node has in total, and the IO bandwidth can be allocated by the data node.

Step S202: The first data node determines an IO bandwidth of a first tenant.

The IO bandwidth of the first tenant is an IO bandwidth required by the first tenant.

For example, when the first tenant requests an IO bandwidth from the first data node, the first data node directly sets the IO bandwidth of the first tenant. For example, the first data node sets the IO bandwidth of the first tenant according to an empirical value or according to a value of the IO bandwidth requested by the first tenant.

For example, when multiple tenants request IO bandwidths from the first data node, the first data node considers both a priority of each tenant and an IO bandwidth requested by each tenant, and adjusts the IO bandwidth required by each tenant. For example, the first data node adjusts the IO bandwidth required by the first tenant.

Step S203: The first data node allocates a first IO bandwidth to the first tenant according to the IO bandwidth of each data node in the at least one data node and the IO bandwidth of the first tenant.

The first IO bandwidth is less than or equal to an IO bandwidth of the first data node, and the first IO bandwidth is greater than 0. Further, the first data node allocates the first IO bandwidth to the first tenant. The first IO bandwidth is greater than 0 and is less than the IO bandwidth of the first data node.

In this embodiment, the at least one data node may include one or more first data nodes, or the first data node may be any one of the at least one data node.

For example, it is assumed that the at least one data node includes three data nodes, that is, the distributed file system includes three data nodes, and the three data nodes are respectively a data node 1, a data node 2, and a data node 3. In an example in which the first data node is the data node 1, after the data node 1 determines IO bandwidths of the three data nodes and the IO bandwidth of the first tenant, the data node 1 may allocate the first IO bandwidth to the first tenant based on an IO bandwidth of each data node in the three data nodes and the IO bandwidth of the first tenant. For example, the data node 1 may allocate an IO bandwidth 1 to the first tenant based on the IO bandwidth of each data node in the three data nodes and the IO bandwidth of the first tenant.

According to the IO bandwidth control method provided in this embodiment of the present application, an IO bandwidth can be allocated to a tenant such that a manner of allocating an IO bandwidth is relatively flexible.

The IO bandwidth of the tenant is shared by at least one user, and each user in the at least one user corresponds to at least one application. Therefore, multiple applications corresponding to the at least one user that belongs to the tenant may share the IO bandwidth allocated to the tenant. Even if the multiple applications may be different at different moments, the multiple applications still share the IO bandwidth allocated to the tenant such that utilization of an IO bandwidth in the distributed file system can be improved.

In comparison with the IO bandwidth control method shown in FIG. 4, each data node may allocate an IO bandwidth to a tenant without an instruction of a name node in the IO bandwidth control method shown in FIG. 9 in this embodiment. Therefore, the name node does not need to participate in an IO bandwidth allocation process, thereby alleviating a burden of the name node, saving resources of the name node, and reducing overheads of the name node.

Further, because each data node does not need to allocate an IO bandwidth to a tenant according to an instruction of the name node, each data node may allocate an IO bandwidth to a tenant in real time, thereby improving real-time quality of controlling an IO bandwidth at a tenant level.

Optionally, in this embodiment of the present application, the first IO bandwidth is less than or equal to the IO bandwidth of the first tenant, or the first IO bandwidth is less than or equal to a sum of the IO bandwidth of the first tenant and an extra bandwidth.

For example, the IO bandwidth required by the first tenant may be relatively large, and the first data node may not be capable of allocating sufficient IO bandwidths to the first tenant. Therefore, the first IO bandwidth is less than or equal to the IO bandwidth required by the first tenant, that is, the IO bandwidth of the first tenant.

For example, because a service priority of the first tenant may be relatively high, the first data node needs to preferentially ensure the IO bandwidth required by the first tenant. Therefore, the first data node may allocate an extra bandwidth to the first tenant in addition to allocating the IO bandwidth required by the first tenant to the first tenant in order to preferentially ensure the IO bandwidth required by the first tenant. Therefore, the first JO bandwidth may be greater than or equal to the IO bandwidth required by the first tenant (further, the IO bandwidth of the first tenant), and is less than or equal to the sum of the IO bandwidth of the first tenant and the extra bandwidth. The extra bandwidth may be a bandwidth greater than 0.

The first data node may allocate a proper IO bandwidth to the first tenant in order to satisfy an IO bandwidth requirement of the first tenant as much as possible.

Optionally, with reference to FIG. 9, after step S203, the IO bandwidth control method provided in this embodiment of the present application may further include the following steps.

Step S204: The first data node determines that an IO bandwidth that is used by the first tenant on the at least one data node is at least one utilized bandwidth.

The at least one utilized bandwidth is in a one-to-one correspondence with the at least one data node.

For example, it is assumed that the at least one data node includes three data nodes, and the three data nodes are respectively a data node 1, a data node 2, and a data node 3. In an example in which the first data node is the data node 1, the first data node obtains, from the three data nodes (the data node 1, the data node 2, and the data node 3), IO bandwidths that are used by the first tenant on the three data nodes, and uses the obtained three IO bandwidths as three utilized bandwidths. An IO bandwidth used on the data node 1 is a utilized bandwidth 1, an IO bandwidth used on the data node 2 is a utilized bandwidth 2, and an IO bandwidth used on the data node 3 is a utilized bandwidth 3.

A utilized bandwidth used by the first tenant on a data node is less than or equal to an IO bandwidth of the data node.

Step S205: The first data node adjusts the first IO bandwidth according to the at least one utilized bandwidth.

For example, after the first data node allocates the first IO bandwidth to the first tenant, the first tenant may not use all the first IO bandwidth, or the first IO bandwidth may be less than the IO bandwidth required by the first tenant, or there is a big difference of using the first IO bandwidth by the first tenant (for example, a part of the first IO bandwidth is entirely used by the first tenant, but the other part of the first IO bandwidth is rarely used by the first tenant). Therefore, the first data node needs to adjust, according to an actual utilized bandwidth (further, the at least one utilized bandwidth) of the first tenant, the first IO bandwidth allocated by the first data node to the first tenant. In this way, the first data node can properly allocate an IO bandwidth to the first tenant.

Optionally, with reference to FIG. 9, after step S203, the IO bandwidth control method provided in this embodiment of the present application may further include the following steps.

Step S206: The first data node determines an IO bandwidth that is in the first IO bandwidth and that is used by the first tenant.

Step S207: The first data node adjusts the first IO bandwidth according to the IO bandwidth that is in the first IO bandwidth and that is used by the first tenant.

For specific description of the IO bandwidth that is in the first IO bandwidth and that is used by the first tenant (an IO bandwidth that is in the first IO bandwidth and that is used by the first tenant), refer to related description of the at least one utilized bandwidth in step S204. Details are not described herein again.

After the first data node allocates the first IO bandwidth to the first tenant, the first data node may adjust the first IO bandwidth according to an IO bandwidth that is in the first IO bandwidth and that is actually used by the first tenant. For example, if the IO bandwidth that is in the first IO bandwidth and that is actually used by the first tenant is relatively large (for example, a difference between the first IO bandwidth and the IO bandwidth that is in the first IO bandwidth and that is actually used by the first tenant is less than or equal to a threshold), the first data node increases the first IO bandwidth. If the IO bandwidth that is in the first IO bandwidth and that is actually used by the first tenant is relatively small (for example, a difference between the first IO bandwidth and the IO bandwidth that is in the first IO bandwidth and that is actually used by the first tenant is greater than a threshold), the first data node decreases the first IO bandwidth. In this way, the first data node can provide a proper IO bandwidth for the first tenant, and may satisfy an IO bandwidth requirement of the first tenant as much as possible.

Optionally, in the IO bandwidth control method provided in this embodiment of the present application, the first tenant is a tenant in m tenants (that is, the m tenants include the first tenant), the m tenants are tenants to which the at least one data node (including the first data node) allocates an IO bandwidth, and m is a positive integer. With reference to FIG. 9, step S202 may include the following step.

Step S202a: The first data node determines the IO bandwidth of the first tenant according to a weight of each tenant in the m tenants and a sum of the IO bandwidth of each data node in the at least one data node.

For specific description of step S202a, refer to related description of step S102a in the foregoing embodiment. Details are not described herein again.

When allocating an IO bandwidth to a tenant, because the first data node performs allocation according to a weight of each tenant, the IO bandwidth allocated to each tenant may evenly satisfy an IO bandwidth requirement of each tenant as much as possible.

Figure 10:
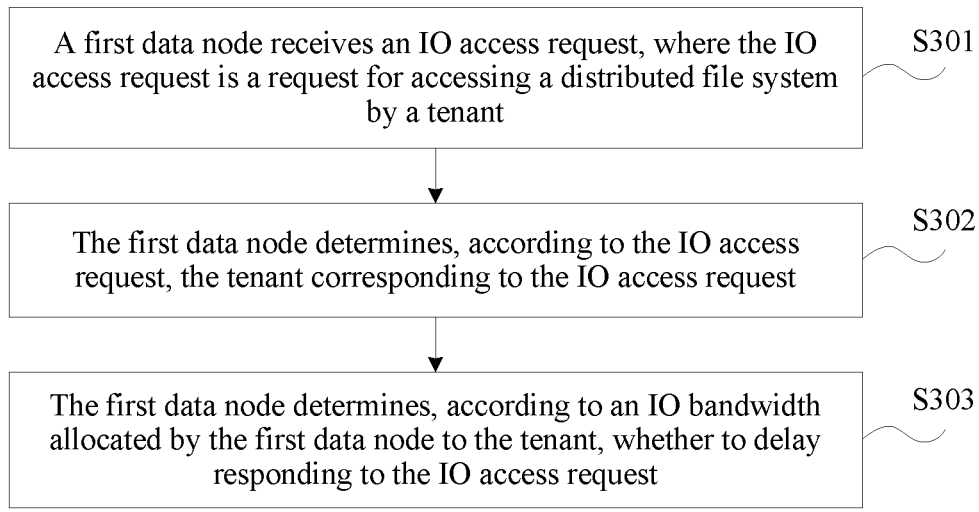
FIG. 10 is a flowchart of an IO access request processing method according to an embodiment of the present application.

An embodiment of the present application provides an IO access request processing method. The method is applied to a distributed file system, and the distributed file system may be the distributed file system shown in FIG. 2 or FIG. 3. The distributed file system includes at least one data node, and the at least one data node includes a first data node. As shown in FIG. 10, the method includes the following steps.

Step S301: The first data node receives an IO access request, where the IO access request is a request for accessing the distributed file system by a tenant.

Step S302: The first data node determines, according to the IO access request, the tenant corresponding to the IO access request.

Step S303: The first data node determines, according to an IO bandwidth allocated by the first data node to the tenant, whether to delay responding to the IO access request.

In this embodiment of the present application, after the first data node receives the IO access request for accessing the distributed file system by the tenant, the first data node first determines, according to the IO access request, the tenant corresponding to the IO access request (that is, a tenant that accesses the distributed file system), and then the first data node determines, according to the IO bandwidth allocated by the first data node to the tenant, whether to delay responding to the IO access request. For example, if a large part of the IO bandwidth allocated by the first data node to the tenant has been used by the tenant, that is, the first data node does not have sufficient IO bandwidths to respond to the IO access request (an idle IO bandwidth of the tenant is less than an IO bandwidth that is required by the tenant to respond to the IO access request), the first data node may delay responding to the IO access request. If only a small part of the IO bandwidth allocated by the first data node to the tenant has been used by the tenant, that is, the first data node has sufficient IO bandwidths to respond to the IO access request (an idle IO bandwidth of the tenant is greater than or equal to an IO bandwidth that is required by the tenant to respond to the IO access request), the first data node may immediately respond to the IO access request. Specific details are described in the following embodiment, and are not described herein again.

The first data node immediately responding to the IO access request may be understood as the first data node directly responds to the IO access request after the first data node determines that the IO access request can be responded to.

The IO access request processing method provided in this embodiment of the present application is applied to a distributed file system, the distributed file system includes at least one data node, and the at least one data node includes a first data node. In this method, the first data node receives an IO access request for accessing the distributed file system by a tenant, determines, according to the IO access request, the tenant corresponding to the IO access request, and then determines, according to an IO bandwidth allocated by the first data node to the tenant, whether to delay responding to the IO access request. In this embodiment of the present application, an IO bandwidth can be allocated to a tenant on a data node, and then the data node may determine, according to the IO bandwidth allocated to the tenant, whether to delay responding to an IO access request corresponding to the tenant (that is, in this embodiment of the present application, the IO access request is certainly responded to, and the responding may be immediate responding or delayed responding) such that a success rate of responding to the IO access request can be increased.

Figure 11:
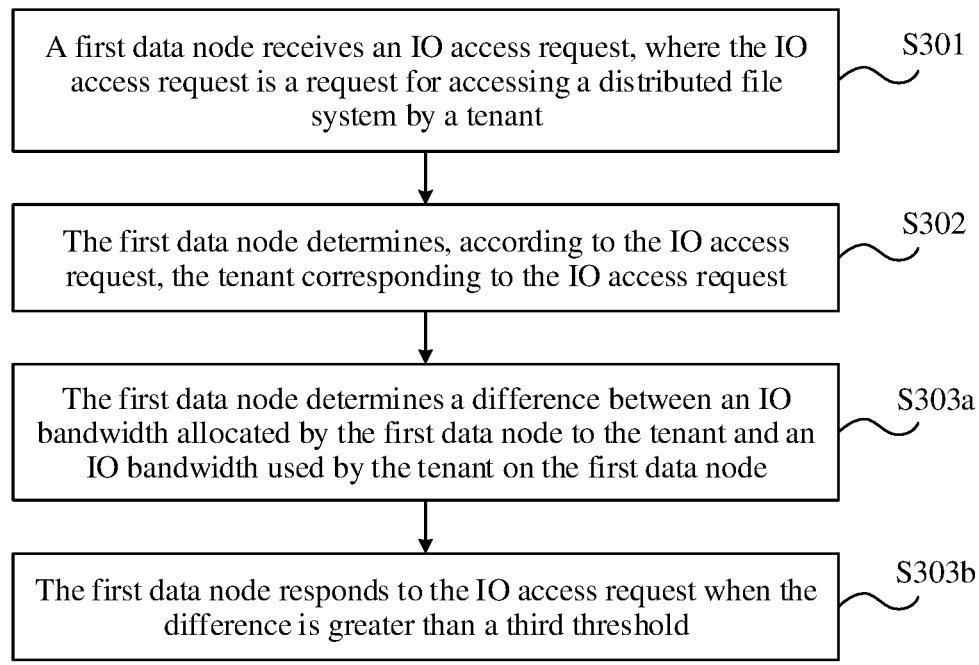
FIG. 11 is a flowchart of an IO access request processing method according to an embodiment of the present application.

Optionally, with reference to FIG. 10, as shown in FIG. 11, step S303 may include the following steps.

Step S303a: The first data node determines a difference between the IO bandwidth allocated by the first data node to the tenant and an IO bandwidth used by the tenant on the first data node.

The difference may represent the idle IO bandwidth of the tenant.

Step S303b: The first data node responds to the IO access request when the difference is greater than a third threshold.

When the first data node determines that the difference between the IO bandwidth allocated by the first data node to the tenant and the IO bandwidth used by the tenant on the first data node is greater than the third threshold, it indicates that some idle IO bandwidths exist in the IO bandwidth allocated by the first data node to the tenant, that is, the first data node has sufficient IO bandwidths to respond to the IO access request for accessing the distributed file system by the tenant. In this case, the first data node may immediately respond to the IO access request.

Figure 12:
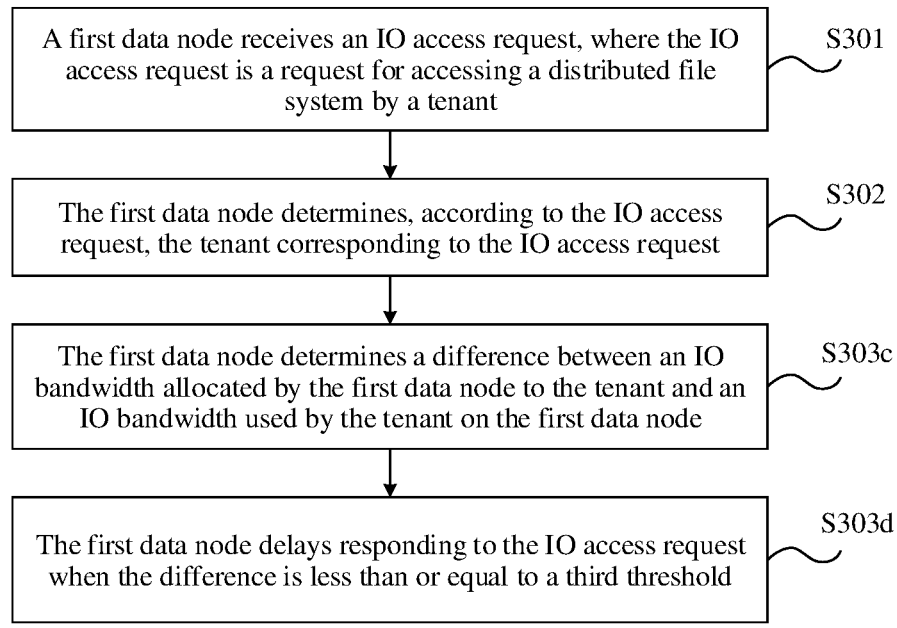
FIG. 12 is a flowchart of an IO access request processing method according to an embodiment of the present application.

Optionally, with reference to FIG. 10, as shown in FIG. 12, step S303 may include the following steps.

Step S303c: The first data node determines a difference between the IO bandwidth allocated by the first data node to the tenant and an IO bandwidth used by the tenant on the first data node.

Step S303d: The first data node delays responding to the IO access request when the difference is less than or equal to a third threshold.

When the first data node determines that the difference between the IO bandwidth allocated by the first data node to the tenant and the IO bandwidth used by the tenant on the first data node is less than or equal to the third threshold, it indicates that few idle IO bandwidths exist in the IO bandwidth allocated by the first data node to the tenant, that is, the first data node currently does not have sufficient IO bandwidths to respond to the IO access request for accessing the distributed file system by the tenant. In this case, the first data node may delay responding to the IO access request, that is, when IO bandwidths remaining in the IO bandwidth allocated by the first data node to the tenant are sufficient to respond to the IO access request, the first data node responds to the IO access request.

Optionally, in the IO access request processing method provided in this embodiment of the present application, the first data node may allocate the IO bandwidth to the tenant using the following method.

Step S304: The first data node receives an instruction of a name node.

Step S305: The first data node allocates the IO bandwidth to the tenant according to the instruction of the name node.

The first data node may allocate the IO bandwidth to the tenant according to the instruction of the name node. Further, the name node may determine a quantity of IO bandwidths that the first data node needs to allocate to the tenant, and then the name node indicates the IO bandwidths to the first data node. The first data node allocates, to the tenant, the IO bandwidths indicated by the name node. In this way, because the name node may instruct each data node to allocate an IO bandwidth to the tenant, the IO bandwidth can be properly allocated to the tenant.

Optionally, with reference to FIG. 10, in this embodiment of the present application, step S302 may include the following step.

Step S302a: The first data node determines, according to a tenant identifier carried in the IO access request, the tenant corresponding to the IO access request.

In this embodiment of the present application, the IO access request for accessing the distributed file system by the tenant may carry the tenant identifier. Further, the distributed file system manages a file that belongs to the tenant, and a file attribute of the file includes the tenant identifier of the tenant. In a scenario, the distributed file system manages files of different tenants, and a tenant to which a file belongs may be determined according to a tenant identifier included in a file attribute of the file.

After receiving the IO access request, the first data node may determine, according to the tenant identifier carried in the IO access request, the tenant corresponding to the IO access request.

Optionally, with reference to FIG. 10, in this embodiment of the present application, a file attribute of a file that belongs to the tenant and that is managed by the distributed file system includes a tenant identifier, and step S302 may include the following steps.

Step S302b: The first data node obtains, according to a file specified in the IO access request, a file attribute of the file specified in the IO access request.

Step S302c: The first data node determines, according to a tenant identifier included in the obtained file attribute, the tenant corresponding to the IO access request.

In this embodiment of the present application, because the file attribute of the file that belongs to the tenant and that is managed by the distributed file system includes the tenant identifier, after the first data node receives the IO access request, the first data node may first obtain, according to the file specified in the IO access request, the file attribute of the file specified in the IO access request, and then the first data node determines, according to the tenant identifier included in the file attribute, the tenant corresponding to the IO access request.

According to the foregoing two methods, after receiving the IO access request, the first data node may accurately determine the tenant corresponding to the IO access request, and then determine, according to the IO bandwidth allocated by the first data node to the tenant, whether to delay responding to the IO access request.

Optionally, in the distributed file system provided in this embodiment of the present application, an IO bandwidth of a tenant is allocated to at least one user that belongs to the tenant for use, and one user may log in to at least one client (that is, one user may be corresponding to multiple applications). After the first data node allocates the IO bandwidth to the tenant, the first data node may further allocate an IO bandwidth to the at least one user that belongs to the tenant, and allocate an IO bandwidth to the at least one client to which the at least one user logs in. In this way, the first data node may finally sequentially allocate an IO bandwidth to each client in a form of "tenant→user→client".

The following describes an example in which the first data node allocates the IO bandwidth to the at least one user that belongs to the tenant.

The first data node allocates an IO bandwidth to each user in the at least one user according to a weight of each user in the at least one user and the IO bandwidth allocated by the first data node to the tenant.

The weight of each user may be further determined according to a service priority of each user and/or an IO bandwidth required by a service of the user. Further, a higher service priority of a user indicates a larger weight of the user, and a larger IO bandwidth required by a service of a user indicates a larger weight of the user. Optionally, when a weight of a user is determined according to a service priority of the user and an IO bandwidth required by a service of the user, a weight (such as a weight 3) may be preferentially determined according to the service priority of the user, then based on the weight, the weight is accordingly adjusted according to the IO bandwidth required by the service of the user, and an adjusted weight (such as a weight 4) is determined as the weight of the user. In this way, the determined weight of the user is relatively accurate.

A manner in which the first data node allocates the IO bandwidth to each user in the at least one user according to the weight of each user in the at least one user and the IO bandwidth allocated by the first data node to the tenant may be as follows.

The first data node allocates, using a formula 2 and based on the IO bandwidth allocated by the first data node to the tenant, the IO bandwidth to each user in the at least one user that uses the tenant.

The formula 2 includes that an IO bandwidth of a user=a weight of the user/a sum of weights of all users who use the tenant×the IO bandwidth allocated by the first data node to the tenant.

For example, it is assumed that there are three users using a tenant, and the three users are respectively a user 1, a user 2, and a user 3, a weight of the user 1 is 1, a weight of the user 2 is 2, and a weight of the user 3 is 3, and the IO bandwidth allocated by the first data node to the tenant is N.

An IO bandwidth of the user 1=the weight of the user 1/(the weight of the user 1+the weight of the user 2+the weight of the user 3)×the IO bandwidth allocated by the first data node to the tenant=1/(1+2+3)×N=N/6.

An IO bandwidth of the user 2=the weight of the user 2/(the weight of the user 1+the weight of the user 2+the weight of the user 3)×the IO bandwidth allocated by the first data node to the tenant=2/(1+2+3)×N=N/3.

An IO bandwidth of the user 3=the weight of the user 3/(the weight of the user 1+the weight of the user 2+the weight of the user 3)×the IO bandwidth allocated by the first data node to the tenant=3/(1+2+3)×N=N/2.

In this embodiment of the present application, when allocating, using the formula 2, an IO bandwidth to each user that belongs to the tenant, because the first data node performs allocation according to a weight of each user, the IO bandwidth allocated to each user may evenly satisfy an IO bandwidth requirement of each user as much as possible.

The following describes an example in which the first data node allocates an IO bandwidth to at least one client to which a first user that belongs to the tenant logs in. The first user refers to any one of the at least one user that belongs to the tenant.

The first data node allocates an IO bandwidth to each client in the at least one client according to a weight of each client in the at least one client and an IO bandwidth allocated by the first data node to the first user.

The weight of each client may be determined according to a service priority of each client and/or an IO bandwidth required by a service of the client. Further, a higher service priority of a client indicates a larger weight of the client, and a larger IO bandwidth required by a service of a client indicates a larger weight of the client. Optionally, when a weight of a client is determined according to a service priority of the client and an IO bandwidth required by a service of the client, a weight (such as a weight 5) may be preferentially determined according to the service priority of the client, then based on the weight, the weight is accordingly adjusted according to the IO bandwidth required by the service of the client, and an adjusted weight (such as a weight 6) is determined as the weight of the client. In this way, the determined weight of the client is relatively accurate.

A manner in which the first data node allocates the IO bandwidth to each client in the at least one client according to the weight of each client in the at least one client and the IO bandwidth allocated by the first data node to the first user may be as follows.

The first data node allocates, using a formula 3 and based on the IO bandwidth allocated by the first data node to the first user, the IO bandwidth to each client in the at least one client started by the first user.

The formula 3 includes that an IO bandwidth of a client=a weight of the client/a sum of weights of all clients started by the first user×the IO bandwidth allocated by the first data node to the first user.

For example, it is assumed that there are three clients started by the first user, and the three clients are respectively a client 1, a client 2, and a client 3, a weight of the client 1 is 1, a weight of the client 2 is 2, and a weight of the client 3 is 3, and the IO bandwidth allocated by the first data node to the first user is A.

An IO bandwidth of the client 1=the weight of the client 1/(the weight of the client 1+the weight of the client 2+the weight of the client 3)×the IO bandwidth allocated by the first data node to the first user=1/(1+2+3)×A=A/6.

An IO bandwidth of the client 2=the weight of the client 2/(the weight of the client 1+the weight of the client 2+the weight of the client 3)×the IO bandwidth allocated by the first data node to the first user=2/(1+2+3)×A=A/3.

An IO bandwidth of the client 3=the weight of the client 3/(the weight of the client 1+the weight of the client 2+the weight of the client 3)×the IO bandwidth allocated by the first data node to the first user=3/(1+2+3)×A=A/2.

In this embodiment of the present application, when allocating, using the formula 3, an IO bandwidth to each client to which a user logs in, because the first data node performs allocation according to a weight of each client, the IO bandwidth allocated to each client may evenly satisfy an IO bandwidth requirement of each client as much as possible.

Figure 13:
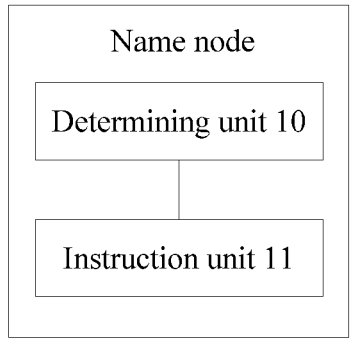
FIG. 13 is a schematic structural diagram of a name node according to an embodiment of the present application.

As shown in FIG. 13, an embodiment of the present application provides a name node. The name node is applied to a distributed file system, the distributed file system includes the name node and at least one data node, and the name node is configured to perform steps performed by a name node in the IO bandwidth control method shown in any one of FIG. 4 to FIG. 8. The name node may include units and/or modules corresponding to the corresponding steps. For example, the name node includes the units corresponding to the corresponding steps, and the name node includes a determining unit 10 and an instruction unit 11.

The determining unit 10 is configured to determine an IO bandwidth of each data node in the at least one data node and an IO bandwidth of a first tenant. The instruction unit 11 is configured to instruct, based on the IO bandwidth of each data node in the at least one data node and the IO bandwidth of the first tenant that are determined by the determining unit 10, the at least one data node to allocate at least one IO bandwidth to the first tenant. The at least one IO bandwidth is in a one-to-one correspondence with the at least one data node, each IO bandwidth in the at least one IO bandwidth is less than or equal to an IO bandwidth of a corresponding data node, and each IO bandwidth in the at least one IO bandwidth is greater than 0.

Optionally, a sum of the at least one IO bandwidth is less than or equal to the IO bandwidth of the first tenant, or a sum of the at least one IO bandwidth is less than or equal to a sum of the IO bandwidth of the first tenant and an extra bandwidth.

Optionally, the at least one data node includes a first data node, an IO bandwidth allocated by the first data node to the first tenant according to an instruction of the instruction unit 11 is a first IO bandwidth, and the first IO bandwidth is an IO bandwidth that is in the at least one IO bandwidth and that corresponds to the first data node.

The determining unit 10 is further configured to determine that an IO bandwidth that is in the at least one IO bandwidth and that is used by the first tenant is at least one utilized bandwidth after the instruction unit 11 instructs the at least one data node to allocate the at least one IO bandwidth to the first tenant, where the at least one utilized bandwidth is in a one-to-one correspondence with the at least one IO bandwidth. The instruction unit 11 is further configured to instruct the at least one data node to adjust a corresponding IO bandwidth in the at least one IO bandwidth, or instruct the first data node to adjust the first IO bandwidth, according to the at least one utilized bandwidth determined by the determining unit 10.

Optionally, the determining unit 10 is further configured to determine that an IO bandwidth that is in the at least one IO bandwidth and that is used by the first tenant is at least one utilized bandwidth after the instruction unit 11 instructs the at least one data node to allocate the at least one IO bandwidth to the first tenant, where the at least one utilized bandwidth is in a one-to-one correspondence with the at least one IO bandwidth. The instruction unit 11 is further configured to instruct a second data node to allocate an IO bandwidth to the first tenant when a difference between the sum of the at least one IO bandwidth and a sum of the at least one utilized bandwidth determined by the determining unit 10 is less than or equal to a first threshold, where the at least one data node does not include the second data node.

Optionally, the determining unit 10 is further configured to determine that an IO bandwidth that is in the at least one IO bandwidth and that is used by the first tenant is at least one utilized bandwidth after the instruction unit 11 instructs the at least one data node to allocate the at least one IO bandwidth to the first tenant, where the at least one utilized bandwidth is in a one-to-one correspondence with the at least one IO bandwidth. The instruction unit 11 is further configured to instruct a third data node to adjust an IO bandwidth allocated by the third data node to the first tenant to 0 when a difference between the sum of the at least one IO bandwidth and a sum of the at least one utilized bandwidth determined by the determining unit 10 is greater than a first threshold, where the at least one data node includes the third data node.

Optionally, the at least one data node includes a first data node, an IO bandwidth allocated by the first data node to the first tenant according to an instruction of the instruction unit 11 is a first IO bandwidth, and the first IO bandwidth is an IO bandwidth that is in the at least one IO bandwidth and corresponding to the first data node.

The determining unit 10 is further configured to determine an IO bandwidth that is in the first IO bandwidth and that is used by the first tenant after the instruction unit 11 instructs the at least one data node to allocate the at least one IO bandwidth to the first tenant. The instruction unit 11 is further configured to instruct, according to the IO bandwidth that is in the first IO bandwidth, that is used by the first tenant, and that is determined by the determining unit 10, the first data node to adjust the first IO bandwidth.

Optionally, m tenants include the first tenant, and m is a positive integer.

The determining unit 10 is further configured to determine the IO bandwidth of the first tenant according to a weight of each tenant in the m tenants and a sum of the IO bandwidth of each data node in the at least one data node.

The determining unit 10 and the instruction unit 11 may be implemented by at least one processor in the name node by executing a computer execution instruction stored in a memory.

It can be understood that the name node in this embodiment may be corresponding to a name node in the IO bandwidth control method shown in any one of FIG. 4 to FIG. 8, and division of the units and/or the modules in the name node in this embodiment is to implement the method procedure shown in any one of FIG. 4 to FIG. 8. To avoid repetition, implementation of a function of each unit and/or module is not described herein again.

The name node provided in this embodiment of the present application is applied to a distributed file system, and the distributed file system includes the name node and at least one data node. The name node determines an IO bandwidth of each data node in the at least one data node and an IO bandwidth of a first tenant, and instructs, according to the IO bandwidth of each data node in the at least one data node and the IO bandwidth of the first tenant, the at least one data node to allocate the at least one IO bandwidth to the first tenant. The name node provided in this embodiment of the present application can instruct a data node to allocate an IO bandwidth to a tenant such that a manner of allocating an IO bandwidth is relatively flexible. Further, the IO bandwidth of the tenant is shared by at least one user, and each user in the at least one user corresponds to at least one application. Therefore, multiple applications that belong to the tenant may share the IO bandwidth allocated to the tenant. Even if the multiple applications may be different at different moments, the multiple applications still share the IO bandwidth allocated to the tenant such that utilization of an IO bandwidth in the distributed file system can be improved.

Figure 14:
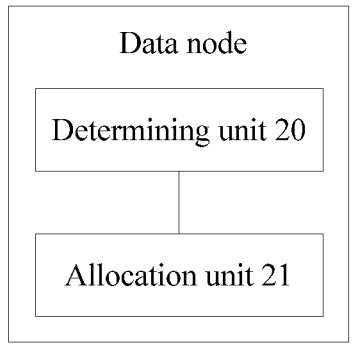
FIG. 14 is a schematic structural diagram of a data node according to an embodiment of the present application.

As shown in FIG. 14, an embodiment of the present application provides a data node. The data node is applied to a distributed file system, the distributed file system includes at least one data node, and the data node provided in this embodiment of the present application may be any one of the at least one data node. The data node is configured to perform steps performed by a first data node in the IO bandwidth control method shown in FIG. 9. The data node may include units and/or modules corresponding to the corresponding steps. For example, the data node includes the units corresponding to the corresponding steps, and the data node includes a determining unit 20 and an allocation unit 21.

The determining unit 20 is configured to determine an IO bandwidth of each data node in the at least one data node and an IO bandwidth of a first tenant. The allocation unit 21 is configured to allocate a first IO bandwidth to the first tenant according to the IO bandwidth of each data node in the at least one data node and the IO bandwidth of the first tenant that are determined by the determining unit 20. The first IO bandwidth is less than or equal to an IO bandwidth of a first data node, and the first IO bandwidth is greater than 0.

Optionally, the determining unit 20 is further configured to determine that an IO bandwidth that is used by the first tenant on the at least one data node is at least one utilized bandwidth after the allocation unit 21 allocates the first IO bandwidth to the first tenant. The allocation unit 21 is further configured to adjust the first IO bandwidth according to the at least one utilized bandwidth determined by the determining unit 20.

Optionally, the determining unit 20 is further configured to determine an IO bandwidth that is in the first IO bandwidth and that is used by the first tenant after the allocation unit 21 allocates the first IO bandwidth to the first tenant. The allocation unit 21 is further configured to adjust the first IO bandwidth according to the IO bandwidth that is in the first IO bandwidth, that is used by the first tenant, and that is determined by the determining unit 20.

Optionally, the first tenant is a tenant in m tenants (that is, the m tenants include the first tenant), and m is a positive integer.

The determining unit 20 is further configured to determine the IO bandwidth of the first tenant according to a weight of each tenant in the m tenants and a sum of the IO bandwidth of each data node in the at least one data node.

The determining unit 20 and the allocation unit 21 may be implemented by at least one processor in the data node by executing a computer execution instruction stored in a memory.

It can be understood that the data node in this embodiment may be corresponding to a first data node in the IO bandwidth control method shown in FIG. 9, and division of the units and/or the modules in the data node in this embodiment is to implement the method procedure shown in FIG. 9. To avoid repetition, implementation of a function of each unit and/or module is not described herein again.

The data node provided in this embodiment of the present application is applied to a distributed file system, the distributed file system includes at least one data node, and the at least one data node includes the data node. The data node determines an IO bandwidth of each data node in the at least one data node and an IO bandwidth of a first tenant, and allocates a first IO bandwidth to the first tenant according to the IO bandwidth of each data node in the at least one data node and the IO bandwidth of the first tenant. The data node provided in this embodiment of the present application can allocate an IO bandwidth to a tenant such that a manner of allocating an IO bandwidth is relatively flexible. Further, the IO bandwidth of the tenant is shared by at least one user, and each user in the at least one user corresponds to at least one application. Therefore, multiple applications that belong to the tenant may share the IO bandwidth allocated to the tenant. Even if the multiple applications may be different at different moments, the multiple applications still share the IO bandwidth allocated to the tenant such that utilization of an IO bandwidth in the distributed file system can be improved.

Figure 15:
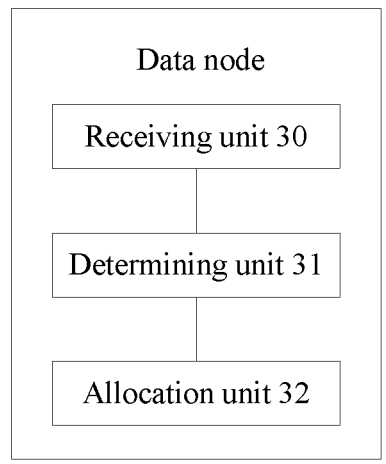
FIG. 15 is a schematic structural diagram of another data node according to an embodiment of the present application.

As shown in FIG. 15, an embodiment of the present application provides a data node. The data node is applied to a distributed file system, the distributed file system includes at least one data node, the at least one data node includes the data node, and the data node is configured to perform steps performed by a data node in the IO access request processing method shown in any one of FIG. 10 to FIG. 12. The data node may include units and/or modules corresponding to the corresponding steps. For example, the data node includes the units corresponding to the corresponding steps, and the data node includes a receiving unit 30, a determining unit 31, and an allocation unit 32.

The receiving unit 30 is configured to receive an IO access request, where the IO access request is a request for accessing the distributed file system by a tenant. The determining unit 31 is configured to determine, according to the IO access request received by the receiving unit 30, the tenant corresponding to the IO access request, and determine, according to an IO bandwidth allocated by the allocation unit 32 to the tenant, whether to delay responding to the IO access request.

Optionally, the determining unit 31 is further configured to determine a difference between the IO bandwidth allocated by the allocation unit 32 to the tenant and an IO bandwidth used by the tenant on the data node, and respond to the IO access request when the difference is greater than a third threshold.

Optionally, the determining unit 31 is further configured to determine a difference between the IO bandwidth allocated by the allocation unit 32 to the tenant and an IO bandwidth used by the tenant on the data node, and delay responding to the IO access request when the difference is less than or equal to a third threshold.

Optionally, the receiving unit 30 is further configured to receive an instruction of a name node before the allocation unit 32 allocates the IO bandwidth to the tenant. The allocation unit 32 is configured to allocate the IO bandwidth to the tenant according to the instruction of the name node that is received by the receiving unit 30.

Optionally, the determining unit 31 is further configured to determine, according to a tenant identifier carried in the IO access request received by the receiving unit 30, the tenant corresponding to the IO access request.

Optionally, a file attribute of a file that belongs to the tenant and that is managed by the distributed file system includes a tenant identifier.

The determining unit 31 is further configured to obtain, according to a file specified in the IO access request received by the receiving unit 30, a file attribute of the file specified in the IO access request, and determine, according to the tenant identifier included in the obtained file attribute, the tenant corresponding to the IO access request.

The receiving unit 30 may be implemented using an interface circuit in the data node. The determining unit 31 and the allocation unit 32 may be implemented by at least one processor in the data node by executing a computer execution instruction stored in a memory.

It can be understood that the data node in this embodiment may be corresponding to a first data node in the IO access request processing method shown in any one of FIG. 10 to FIG. 12, and division of the units and/or the modules in the data node in this embodiment is to implement the method procedure shown in any one of FIG. 10 to FIG. 12. To avoid repetition, implementation of a function of each unit and/or module is not described herein again.

The data node provided in this embodiment of the present application is applied to a distributed file system, the distributed file system includes at least one data node, and the at least one data node includes the data node. The data node receives an IO access request for accessing the distributed file system by a tenant, determines, according to the IO access request, the tenant corresponding to the IO access request, and then determines, according to an IO bandwidth allocated by the data node to the tenant, whether to delay responding to the IO access request. In this embodiment of the present application, an IO bandwidth can be allocated to a tenant on a data node, and then the data node may determine, according to the IO bandwidth allocated to the tenant, whether to delay responding to an IO access request corresponding to the tenant (that is, in this application, the IO access request is certainly responded to, and the responding may be immediate responding or delayed responding) such that a success rate of responding to the IO access request can be increased.

Figure 16:
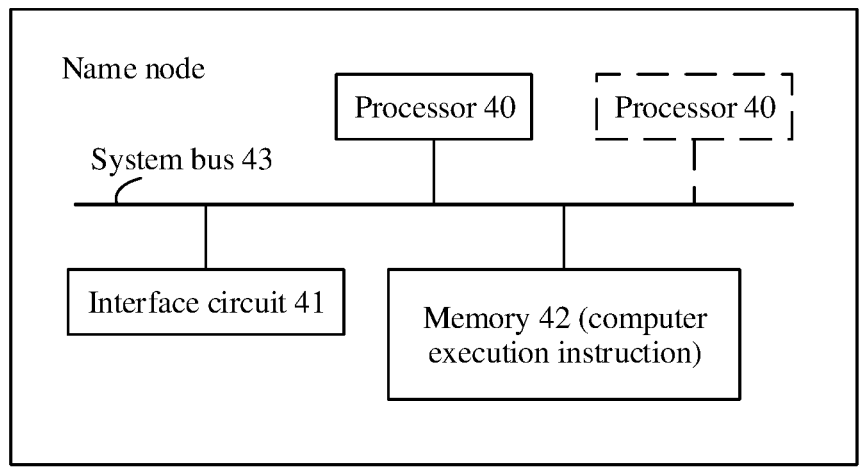
FIG. 16 is a schematic diagram of hardware of a name node according to an embodiment of the present application.

As shown in FIG. 16, an embodiment of the present application provides a name node. The name node is applied to a distributed file system, and the distributed file system includes the name node and at least one data node. The name node includes at least one processor 40, an interface circuit 41, a memory 42, and a system bus 43.

The memory 42 is configured to store a computer execution instruction. The at least one processor 40, the interface circuit 41, and the memory 42 are interconnected using the system bus 43. When the name node runs, the at least one processor 40 executes the computer execution instruction stored in the memory 42 such that the name node performs the IO bandwidth control method shown in any one of FIG. 4 to FIG. 8. Further, for the IO bandwidth control method, refer to related description in the embodiment shown in any one of FIG. 4 to FIG. 8. Details are not described herein again.

The processor 40 may be a central processing unit (CPU). The processor 40 may be another general purpose processor, a digital signal processor (DSP), an application-specific integrated circuit (ASIC), a field programmable gate array (FPGA), another programmable logic device, a discrete gate, a transistor logic device, a discrete hardware component, or the like. The general purpose processor may be a microprocessor, or the processor 40 may be any conventional processor or the like.

The processor 40 may be a dedicated processor, and the dedicated processor may include a chip that has another dedicated processing function of the name node.

The memory 42 may include a volatile memory, for example, a random access memory (RAM). The memory 42 may include a nonvolatile memory, for example, a read-only memory (ROM), a flash memory, a hard disk drive (HDD), or a solid-state drive (SSD). The memory 42 may include a combination of the foregoing types of memories.

The system bus 43 may include a data bus, a power bus, a control bus, a signal status bus, and the like. In this embodiment, for clarity of description, various buses are marked as the system bus 43 in FIG. 16.

The interface circuit 41 may be an IO interface, a network interface, or a communications interface on the name node. The at least one processor 40 performs data exchange with another device such as a data node using the interface circuit 41.

In a specific implementation process, steps in the method procedure shown in any one of FIG. 4 to FIG. 8 may be implemented by the hardware-form processor 40 by executing the software-form computer execution instruction stored in the memory 42. To avoid repetition, details are not described herein again.

An embodiment of the present application provides a computer readable storage medium. The computer readable storage medium stores a computer execution instruction. When at least one processor of a name node executes the computer execution instruction, the name node performs the IO bandwidth control method shown in any one of FIG. 4 to FIG. 8. Further, for the IO bandwidth control method, refer to related description in the embodiment shown in any one of FIG. 4 to FIG. 8. Details are not described herein again.

An embodiment of the present application provides a computer program product. The computer program product includes a computer execution instruction, and the computer execution instruction is stored in a computer readable storage medium. At least one processor of a name node may read the computer execution instruction from the computer readable storage medium, and the at least one processor executes the computer execution instruction such that the name node performs the IO bandwidth control method shown in any one of FIG. 4 to FIG. 8.

The computer readable storage medium may be the memory 42.

The name node provided in this embodiment of the present application is applied to a distributed file system, and the distributed file system includes the name node and at least one data node. The name node determines an IO bandwidth of each data node in the at least one data node and an IO bandwidth of a first tenant, and instructs, according to the IO bandwidth of each data node in the at least one data node and the IO bandwidth of the first tenant, the at least one data node to allocate at least one IO bandwidth to the first tenant. The name node provided in this embodiment of the present application can instruct a data node to allocate an IO bandwidth to a tenant such that a manner of allocating an IO bandwidth is relatively flexible. Further, the IO bandwidth of the tenant is shared by at least one user, and each user in the at least one user corresponds to at least one application. Therefore, multiple applications that belong to the tenant may share the IO bandwidth allocated to the tenant. Even if the multiple applications may be different at different moments, the multiple applications still share the IO bandwidth allocated to the tenant such that utilization of an IO bandwidth in the distributed file system can be improved.

Figure 17:
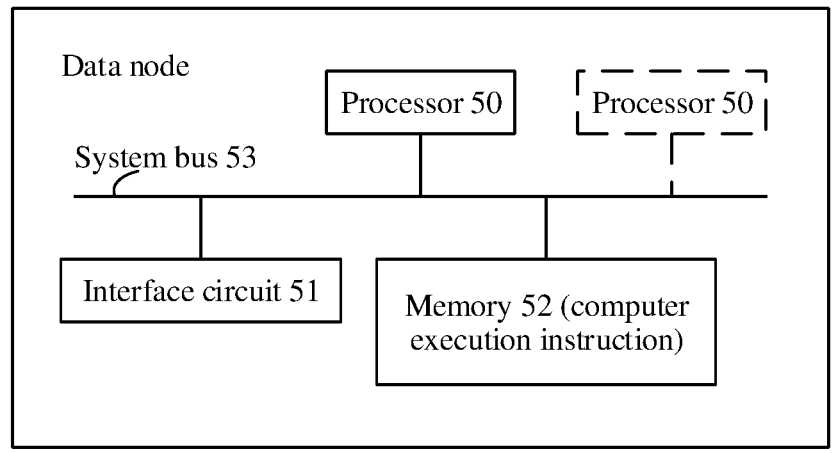
FIG. 17 is a schematic diagram of hardware of a data node according to an embodiment of the present application.

As shown in FIG. 17, an embodiment of the present application provides a data node. The data node is applied to a distributed file system, the distributed file system includes at least one data node, and the at least one data node includes the data node. The data node includes at least one processor 50, an interface circuit 51, a memory 52, and a system bus 53.

The memory 52 is configured to store a computer execution instruction. The at least one processor 50, the interface circuit 51, and the memory 52 are interconnected using the system bus 53. When the data node runs, the at least one processor 50 executes the computer execution instruction stored in the memory 52 such that the data node performs the IO bandwidth control method shown in FIG. 9. Further, for the IO bandwidth control method, refer to related description in the embodiment shown in FIG. 9. Details are not described herein again.

The processor 50 may be a CPU. The processor 50 may be another general purpose processor, a DSP, an ASIC, an FPGA, another programmable logic device, a discrete gate, a transistor logic device, a discrete hardware component, or the like. The general purpose processor may be a microprocessor, or the processor 50 may be any conventional processor or the like.

The processor 50 may be a dedicated processor, and the dedicated processor may include a chip that has another dedicated processing function of the data node.

The memory 52 may include a volatile memory, such as a RAM. The memory 52 may include a nonvolatile memory, such as a ROM, a flash memory, an HDD, or an SSD. The memory 52 may include a combination of the foregoing types of memories.

The system bus 53 may include a data bus, a power bus, a control bus, a signal status bus, and the like. In this embodiment, for clarity of description, various buses are marked as the system bus 53 in FIG. 17.

The interface circuit 51 may be an IO interface, a network interface, or a communications interface on the data node. The at least one processor 50 performs data exchange with another device such as a name node using the interface circuit 51.

In a specific implementation process, steps in the method procedure shown in FIG. 9 may be implemented by the hardware-form processor 50 by executing the software-form computer execution instruction stored in the memory 52. To avoid repetition, details are not described herein again.

An embodiment of the present application provides a computer readable storage medium. The computer readable storage medium stores a computer execution instruction. When at least one processor of a data node executes the computer execution instruction, the data node performs the IO bandwidth control method shown in FIG. 9. Further, for the IO bandwidth control method, refer to related description in the embodiment shown in FIG. 9. Details are not described herein again.

An embodiment of the present application provides a computer program product. The computer program product includes a computer execution instruction, and the computer execution instruction is stored in a computer readable storage medium. At least one processor of a data node may read the computer execution instruction from the computer readable storage medium, and the at least one processor executes the computer execution instruction such that the data node performs the IO bandwidth control method shown in FIG. 9.

The computer readable storage medium may be the memory 52.

The data node provided in this embodiment of the present application is applied to a distributed file system, the distributed file system includes at least one data node, and the at least one data node includes the data node. The data node determines an IO bandwidth of each data node in the at least one data node and an IO bandwidth of a first tenant, and allocates a first IO bandwidth to the first tenant according to the IO bandwidth of each data node in the at least one data node and the IO bandwidth of the first tenant. The data node provided in this embodiment of the present application can allocate an IO bandwidth to a tenant such that a manner of allocating an IO bandwidth is relatively flexible. Further, the IO bandwidth of the tenant is shared by at least one user, and each user in the at least one user corresponds to at least one application. Therefore, multiple applications that belong to the tenant may share the IO bandwidth allocated to the tenant. Even if the multiple applications may be different at different moments, the multiple applications still share the IO bandwidth allocated to the tenant such that utilization of an IO bandwidth in the distributed file system can be improved.

Figure 18:
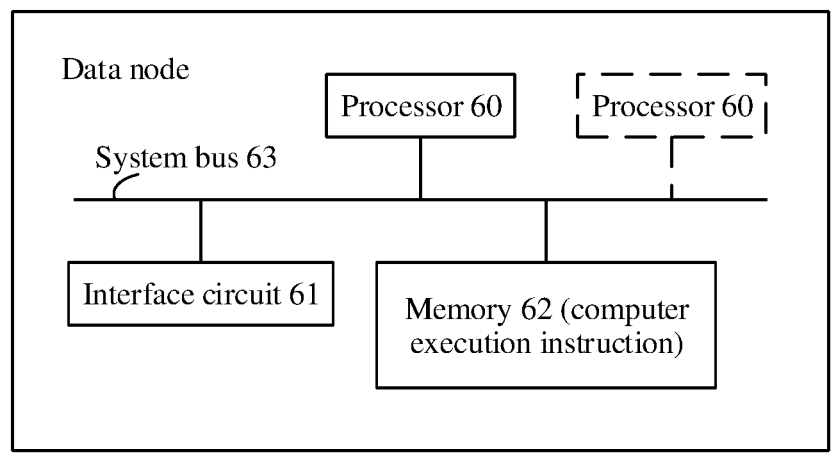
FIG. 18 is a schematic diagram of hardware of another data node according to an embodiment of the present application.

As shown in FIG. 18, an embodiment of the present application provides a data node. The data node is applied to a distributed file system, the distributed file system includes at least one data node, and the at least one data node includes the data node. The data node includes at least one processor 60, an interface circuit 61, a memory 62, and a system bus 63.

The memory 62 is configured to store a computer execution instruction. The at least one processor 60, the interface circuit 61, and the memory 62 are interconnected using the system bus 63. When the data node runs, the at least one processor 60 executes the computer execution instruction stored in the memory 62 such that the data node performs the IO access request processing method shown in any one of FIG. 10 to FIG. 12. Further, for the IO access request processing method, refer to related description in the embodiment shown in any one of FIG. 10 to FIG. 12. Details are not described herein again.

The processor 60 may be further a CPU. The processor 60 may be another general purpose processor, a DSP, an ASIC, an FPGA, another programmable logic device, a discrete gate, a transistor logic device, a discrete hardware component, or the like. The general purpose processor may be a microprocessor, or the processor 60 may be any conventional processor or the like.

The processor 60 may be a dedicated processor, and the dedicated processor may include a chip that has another dedicated processing function of the data node.

The memory 62 may include a volatile memory, such as a RAM. The memory 62 may include a nonvolatile memory, such as a ROM, a flash memory, an HDD, or an SSD. The memory 62 may include a combination of the foregoing types of memories.

The system bus 63 may include a data bus, a power bus, a control bus, a signal status bus, and the like. In this embodiment, for clarity of description, various buses are marked as the system bus 63 in FIG. 18.

The interface circuit 61 may be an IO interface, a network interface, or a communications interface on the data node. The at least one processor 60 performs data exchange with another device such as a name node using the interface circuit 61.

In a specific implementation process, steps in the method procedure shown in any one of FIG. 10 to FIG. 12 may be implemented by the hardware-form processor 60 by executing the software-form computer execution instruction stored in the memory 62. To avoid repetition, details are not described herein again.

An embodiment of the present application provides a computer readable storage medium. The computer readable storage medium stores a computer execution instruction. When at least one processor of a data node executes the computer execution instruction, the data node performs the IO access request processing method shown in any one of FIG. 10 to FIG. 12. Further, for the IO access request processing method, refer to related description in the embodiment shown in any one of FIG. 10 to FIG. 12. Details are not described herein again.

An embodiment of the present application provides a computer program product. The computer program product includes a computer execution instruction, and the computer execution instruction is stored in a computer readable storage medium. At least one processor of a data node may read the computer execution instruction from the computer readable storage medium, and the at least one processor executes the computer execution instruction such that the data node performs the IO access request processing method shown in any one of FIG. 10 to FIG. 12.

The computer readable storage medium may be the memory 62.

The data node provided in this embodiment of the present application is applied to a distributed file system, the distributed file system includes at least one data node, and the at least one data node includes the data node. The data node receives an IO access request for accessing the distributed file system by a tenant, determines, according to the IO access request, the tenant corresponding to the IO access request, and then determines, according to an IO bandwidth allocated by the data node to the tenant, whether to delay responding to the IO access request. In this embodiment of the present application, an IO bandwidth can be allocated to a tenant on a data node, and then the data node may determine, according to the IO bandwidth allocated to the tenant, whether to delay responding to an IO access request corresponding to the tenant (that is, in this application, the IO access request is certainly responded to, and the responding may be immediate responding or delayed responding) such that a success rate of responding to the IO access request can be increased.

An embodiment of the present application provides a distributed file system. The distributed file system includes a name node and at least one data node, and the name node is the name node shown in FIG. 13 or FIG. 16.

Alternatively, the distributed file system includes at least one data node, the at least one data node includes a first data node, and the first data node is the data node shown in FIG. 14 or FIG. 17.

Alternatively, the distributed file system includes at least one data node, the at least one data node includes a first data node, and the first data node is the data node shown in FIG. 15 or FIG. 18.

The distributed file system provided in this embodiment of the present application may be the distributed file system shown in FIG. 2 or FIG. 3. For details, refer to related description of the distributed file system shown in FIG. 2 or FIG. 3 in the foregoing embodiments. Details are not described herein again.

The distributed file system provided in this embodiment of the present application includes a name node and at least one data node. The name node determines an IO bandwidth of each data node in the at least one data node and an IO bandwidth of a first tenant, and instructs, according to the IO bandwidth of each data node in the at least one data node and the IO bandwidth of the first tenant, the at least one data node to allocate the at least one IO bandwidth to the first tenant. The name node provided in this embodiment of the present application can instruct a data node to allocate an IO bandwidth to a tenant such that a manner of allocating an IO bandwidth is relatively flexible. Further, the IO bandwidth of the tenant is shared by at least one user, and each user in the at least one user corresponds to at least one application. Therefore, multiple applications that belong to the tenant may share the IO bandwidth allocated to the tenant. Even if the multiple applications may be different at different moments, the multiple applications still share the IO bandwidth allocated to the tenant such that utilization of an IO bandwidth in the distributed file system can be improved.

The distributed file system provided in this embodiment of the present application includes at least one data node, and the at least one data node includes a first data node. The first data node determines an IO bandwidth of each data node in the at least one data node and an IO bandwidth of a first tenant, and allocates a first IO bandwidth to the first tenant according to the IO bandwidth of each data node in the at least one data node and the IO bandwidth of the first tenant. The data node provided in this embodiment of the present application can allocate an IO bandwidth to a tenant such that a manner of allocating an IO bandwidth is relatively flexible. Further, the IO bandwidth of the tenant is shared by at least one user, and each user in the at least one user corresponds to at least one application. Therefore, multiple applications that belong to the tenant may share the IO bandwidth allocated to the tenant. Even if the multiple applications may be different at different moments, the multiple applications still share the IO bandwidth allocated to the tenant such that utilization of an IO bandwidth in the distributed file system can be improved.

The distributed file system provided in this embodiment of the present application includes at least one data node, and the at least one data node includes a first data node. The first data node receives an IO access request for accessing the distributed file system by a tenant, determines, according to the IO access request, the tenant corresponding to the IO access request, and then determines, according to an IO bandwidth allocated by the first data node to the tenant, whether to delay responding to the IO access request. In this embodiment of the present application, an IO bandwidth can be allocated to a tenant on a data node, and then the data node may determine, according to the IO bandwidth allocated to the tenant, whether to delay responding to an IO access request corresponding to the tenant (that is, in this application, the IO access request is certainly responded to, and the responding may be immediate responding or delayed responding) such that a success rate of responding to the IO access request can be increased.

The foregoing descriptions about implementation manners allow a person skilled in the art to understand that, for the purpose of convenient and brief description, division of the foregoing function modules is taken as an example for illustration. In actual application, the foregoing functions can be allocated to different modules and implemented according to a requirement, that is, an inner structure of an apparatus is divided into different function modules to implement all or a part of the functions described above. For a specific working process of the foregoing system, apparatus, and unit, refer to a corresponding process in the foregoing method embodiments. Details are not described herein again.

In the several embodiments provided in this application, it should be understood that the disclosed system, apparatus, and method may be implemented in another manner. For example, the described apparatus embodiment is merely an example. For example, the module or unit division is merely logical function division and may be other division in actual implementation. For example, multiple units or components may be combined or integrated into another system, or some features may be ignored or not performed. In addition, the displayed or discussed mutual couplings or direct couplings or communication connections may be implemented using some interfaces, and indirect couplings or communication connections between the apparatuses or units may be implemented in electronic, mechanical, or other forms.

The units described as separate parts may or may not be physically separated, and parts displayed as units may or may not be physical units, may be located in one position, or may be distributed on multiple network units. Some or all of the units may be selected according to actual requirements to achieve the objectives of the solutions of the embodiments.

In addition, functional units in the embodiments of the present application may be integrated into one processing unit, or each of the units may exist alone physically, or two or more units are integrated into one unit. The integrated unit may be implemented in a form of hardware, or may be implemented in a form of a software functional unit.

When the integrated unit is implemented in a form of a software functional unit and sold or used as an independent product, the integrated unit may be stored in a computer-readable storage medium. Based on such an understanding, the technical solutions of the present application essentially, the part contributing to the other approaches, or all or some of the technical solutions may be implemented in a form of a software product. The software product is stored in a storage medium and includes several instructions for instructing a computer device (which may be a personal computer, a server, a network device, or the like) or a processor to perform all or some of the steps of the methods described in the embodiments of the present application. The storage medium includes any medium that can store program code, such as a flash memory, a removable hard disk, a read-only memory, a random access memory, a magnetic disk, or an optical disc.

The foregoing descriptions are merely specific implementation manners of the present application, but are not intended to limit the protection scope of the present application. Any variation or replacement readily figured out by a person skilled in the art within the technical scope disclosed in the present application shall fall within the protection scope of the present application. Therefore, the protection scope of the present application shall be subject to the protection scope of the claims.

What is claimed is:

1. An input output (IO) bandwidth control method implemented by a name node in a distributed file system, wherein the IO bandwidth control method comprises:
   determining an IO bandwidth of at least one data node in the distributed file system;
   determining an IO bandwidth of a first tenant according to a weight of each tenant in a plurality of tenants and a sum of the IO bandwidth of each data node in the at least one data node, wherein the IO bandwidth of the first tenant is shared by a plurality of users, wherein each user of the plurality of users corresponds to a plurality of applications, wherein the applications corresponding to the users that belong to the first tenant share the IO bandwidth of the first tenant, and wherein the weight of each tenant is based on a service priority of the tenant and an IO bandwidth required by a service of the tenant; and instructing, based on the IO bandwidth of each data node in the at least one data node and the IO bandwidth of the first tenant, the at least one data node to allocate at least one IO bandwidth to the first tenant, wherein the at least one IO bandwidth is in a one-to-one correspondence with the at least one data node, wherein each IO bandwidth in the at least one IO bandwidth is less than or equal to an IO bandwidth of a corresponding data node, and wherein each IO bandwidth in the at least one IO bandwidth is greater than zero.

2. The IO bandwidth control method according to claim 1, wherein the at least one data node comprises a first data node, wherein an IO bandwidth allocated by the first data node to the first tenant according to an instruction of the name node is a first IO bandwidth, wherein the first IO bandwidth is an IO bandwidth in the at least one IO bandwidth corresponding to the first data node, and wherein after instructing the at least one data node to allocate the at least one IO bandwidth to the first tenant, the IO bandwidth control method further comprises:

determining that an IO bandwidth that is in the at least one IO bandwidth and that is used by the first tenant is at least one utilized bandwidth, wherein the at least one utilized bandwidth is in a one-to-one correspondence with the at least one IO bandwidth; and either instructing the at least one data node to adjust a corresponding IO bandwidth in the at least one IO bandwidth, or instructing the first data node to adjust the first IO bandwidth according to the at least one utilized bandwidth.

3. The IO bandwidth control method according to claim 1, wherein after instructing the at least one data node to allocate the at least one IO bandwidth to the first tenant, the IO bandwidth control method further comprises:

determining that an IO bandwidth that is in the at least one IO bandwidth and that is used by the first tenant is at least one utilized bandwidth, wherein the at least one utilized bandwidth is in a one-to-one correspondence with the at least one IO bandwidth; and instructing a second data node to allocate an IO bandwidth to the first tenant when a difference between a sum of the at least one IO bandwidth and a sum of the at least one utilized bandwidth is less than or equal to a first threshold, wherein the at least one data node does not comprise the second data node.

4. The IO bandwidth control method according to claim 1, wherein after instructing the at least one data node to allocate the at least one IO bandwidth to the first tenant, the IO bandwidth control method further comprises:

determining that an IO bandwidth that is in the at least one IO bandwidth and that is used by the first tenant is at least one utilized bandwidth, wherein the at least one utilized bandwidth is in a one-to-one correspondence with the at least one IO bandwidth; and instructing a third data node to adjust an IO bandwidth allocated by the third data node to the first tenant to zero when a difference between a sum of the at least one IO bandwidth and a sum of the at least one utilized bandwidth is greater than a first threshold, wherein the at least one data node comprises the third data node.

5. The IO bandwidth control method according to claim 1, wherein the at least one data node comprises a first data node, wherein an IO bandwidth allocated by the first data node to the first tenant according to an instruction of the name node is a first IO bandwidth, wherein the first IO bandwidth is an IO bandwidth in the at least one IO bandwidth corresponding to the first data node, and wherein after instructing the at least one data node to allocate the at least one IO bandwidth to the first tenant, the IO bandwidth control method further comprises:

determining an IO bandwidth that is in the first IO bandwidth and that is used by the first tenant; and instructing, according to the IO bandwidth that is in the first IO bandwidth and that is used by the first tenant, the first data node to adjust the first IO bandwidth.

6. A name node in a distributed file system, wherein the name node comprises:

a processor; and a memory coupled to the processor and configured to store instructions, wherein the instructions cause the processor to be configured to:

determine an input output (IO) bandwidth of at least one data node in the distributed file system;

determine an IO bandwidth of a first tenant according to a weight of each tenant in a plurality of tenants and a sum of the IO bandwidth of each data node in the at least one data node, wherein the IO bandwidth of the first tenant is shared by a plurality of users, wherein each user of the plurality of users corresponds to a plurality of applications, wherein the applications corresponding to the users that belong to the first tenant share the IO bandwidth of the first tenant, wherein the weight of each tenant is based on a service priority of the tenant and an IO bandwidth required by a service of the tenant; and instruct, based on the IO bandwidth of each data node in the at least one data node and the IO bandwidth of the first tenant, the at least one data node to allocate at least one IO bandwidth to the first tenant, wherein the at least one IO bandwidth is in a one-to-one correspondence with the at least one data node, wherein each IO bandwidth in the at least one IO bandwidth is less than or equal to an IO bandwidth of a corresponding data node, and wherein each IO bandwidth in the at least one IO bandwidth is greater than 0.

7. The name node according to claim 6, wherein the at least one data node comprises a first data node, wherein an IO bandwidth allocated by the first data node to the first tenant according to an instruction of the name node is a first IO bandwidth, wherein the first IO bandwidth is an IO bandwidth in the at least one IO bandwidth corresponding to the first data node, and wherein the instructions further cause the processor to be configured to:

determine that an IO bandwidth that is in the at least one IO bandwidth and that is used by the first tenant is at least one utilized bandwidth after instructing the at least one data node to allocate the at least one IO bandwidth to the first tenant, wherein the at least one utilized bandwidth is in a one-to-one correspondence with the at least one IO bandwidth; and either instruct the at least one data node to adjust a corresponding IO bandwidth in the at least one IO bandwidth, or instruct the first data node to adjust the first IO bandwidth according to the at least one utilized bandwidth.

8. The name node according to claim 6, wherein the instructions further cause the processor to be configured to:

determine that an IO bandwidth that is in the at least one IO bandwidth and that is used by the first tenant is at least one utilized bandwidth after instructing the at least one data node to allocate the at least one IO bandwidth to the first tenant, wherein the at least one utilized bandwidth is in a one-to-one correspondence with the at least one IO bandwidth; and instruct a second data node to allocate an IO bandwidth to the first tenant when a difference between a sum of the at least one IO bandwidth and a sum of the at least one utilized bandwidth is less than or equal to a first threshold, wherein the at least one data node does not comprise the second data node.

9. The name node according to claim 6, wherein the instructions further cause the processor to be configured to:
determine that an IO bandwidth that is in the at least one IO bandwidth and that is used by the first tenant is at least one utilized bandwidth after instructing the at least one data node to allocate the at least one IO bandwidth to the first tenant, wherein the at least one utilized bandwidth is in a one-to-one correspondence with the at least one IO bandwidth; and instruct a third data node to adjust an IO bandwidth allocated by the third data node to the first tenant to 0 when a difference between a sum of the at least one IO bandwidth and a sum of the at least one utilized bandwidth is greater than a first threshold, wherein the at least one data node comprises the third data node.

10. The name node according to claim 6, wherein the at least one data node comprises a first data node, wherein an IO bandwidth allocated by the first data node to the first tenant according to an instruction of the name node is a first IO bandwidth, wherein the first IO bandwidth is an IO bandwidth in the at least one IO bandwidth corresponding to the first data node, and wherein the instructions further cause the processor to be configured to:
determine an IO bandwidth that is in the first IO bandwidth and that is used by the first tenant after instructing the at least one data node to allocate the at least one IO bandwidth to the first tenant; and instruct, according to the IO bandwidth that is in the first IO bandwidth and that is used by the first tenant, the first data node to adjust the first IO bandwidth.

* * * * *

UNITED STATES PATENT AND TRADEMARK OFFICE
CERTIFICATE OF CORRECTION

PATENT NO. : 10,887,248 B2
APPLICATION NO. : 15/799196
DATED : January 5, 2021
INVENTOR(S) : Yi Li, Jing Li and Yong Zhong Page 1 of 1

It is certified that error appears in the above-identified patent and that said Letters Patent is hereby corrected as shown below:

On the Title Page

Page 2, Column 2, Line 2 References Cited, Foreign Patent Documents: "CN 1037782556 A 5/2014" should read "CN 103782556 A 5/2014"

Signed and Sealed this
Sixteenth Day of February, 2021

Drew Hirshfeld
*Performing the Functions and Duties of the
Under Secretary of Commerce for Intellectual Property and
Director of the United States Patent and Trademark Office*